(12) United States Patent
Mehta et al.

(10) Patent No.: US 8,318,875 B2
(45) Date of Patent: Nov. 27, 2012

(54) SUPER-SOLUTION HOMOGENEOUS PROPYLENE POLYMERIZATION AND POLYPROPYLENES MADE THEREFROM

(75) Inventors: Aspy K. Mehta, Humble, TX (US); Manika Varma-Nair, Warren, NJ (US); Gabor Kiss, Hampton, NJ (US); Robert P. Reynolds, Clinton, NJ (US); John W. Chu, Neshanic Station, NJ (US); Steven P. Rucker, Warren, NJ (US)

(73) Assignee: Exxonmobil Chemical Patents Inc., Houston, TX (US)

( * ) Notice: Subject to any disclaimer, the term of this patent is extended or adjusted under 35 U.S.C. 154(b) by 41 days.

(21) Appl. No.: 12/264,753

(22) Filed: Nov. 4, 2008

(65) Prior Publication Data
US 2010/0113718 A1 May 6, 2010

Related U.S. Application Data

(63) Continuation-in-part of application No. 12/016,346, filed on Jan. 18, 2008, now Pat. No. 7,812,104.

(51) Int. Cl.
*C08F 2/06* (2006.01)
*C08F 4/6592* (2006.01)

(52) U.S. Cl. ......... 526/160; 526/134; 526/170; 526/351

(58) Field of Classification Search .................. 526/134, 526/160, 170, 351
See application file for complete search history.

(56) References Cited

U.S. PATENT DOCUMENTS

| | | | |
|---|---|---|---|
| 2,153,553 A | 4/1939 | Fawcett et al. |
| 2,852,501 A | 9/1958 | Richard, Jr. et al. |
| 3,056,771 A | 10/1962 | Aldridge et al. |
| 3,294,772 A | 12/1966 | Cottle |
| 3,470,143 A | 9/1969 | Schrage et al. |
| 3,678,088 A | 7/1972 | Hedberg et al. |
| 3,725,378 A | 4/1973 | Chamberlin |
| 4,135,044 A | 1/1979 | Beals |
| 4,153,774 A | 5/1979 | Boettcher et al. |
| 4,337,142 A | 6/1982 | Knudson et al. |
| 4,530,914 A | 7/1985 | Ewen et al. |
| 4,588,790 A | 5/1986 | Jenkins, III et al. |
| 4,740,550 A | 4/1988 | Foster |
| 4,769,510 A | 9/1988 | Kaminsky et al. |
| 4,794,004 A | 12/1988 | Pfleger et al. |
| 4,794,096 A | 12/1988 | Ewen |
| 4,962,262 A | 10/1990 | Winter et al. |
| 5,026,798 A | 6/1991 | Canich |
| 5,081,322 A | 1/1992 | Winter et al. |
| 5,084,534 A | 1/1992 | Welborn, Jr. et al. |
| 5,096,867 A | 3/1992 | Canich |
| 5,236,998 A | 8/1993 | Lundeen et al. |
| 5,272,236 A | 12/1993 | Lai et al. |
| 5,324,799 A | 6/1994 | Yano et al. |
| 5,324,800 A | 6/1994 | Welborn, Jr. et al. |
| 5,326,835 A | 7/1994 | Ahvenainen et al. |
| 5,328,969 A | 7/1994 | Winter et al. |
| 5,332,706 A | 7/1994 | Nowlin et al. |
| 5,352,749 A | 10/1994 | DeChellis et al. |
| 5,382,630 A | 1/1995 | Stehling et al. |
| 5,382,631 A | 1/1995 | Stehling et al. |
| 5,391,654 A | 2/1995 | Ahvenainen et al. |
| 5,405,922 A | 4/1995 | DeChellis et al. |
| 5,408,017 A | 4/1995 | Turner et al. |
| 5,416,153 A | 5/1995 | Winter et al. |
| 5,434,116 A | 7/1995 | Sone et al. |
| 5,455,365 A | 10/1995 | Winter et al. |
| 5,466,766 A | 11/1995 | Patsidis et al. |
| 5,468,810 A | 11/1995 | Hayakawa et al. |
| 5,489,659 A | 2/1996 | Sugano et al. |
| 5,504,171 A | 4/1996 | Etherton et al. |
| 5,504,232 A | 4/1996 | Winter et al. |
| 5,514,761 A | 5/1996 | Etherton et al. |
| 5,585,509 A | 12/1996 | Langhauser et al. |
| 5,635,573 A | 6/1997 | Harrington et al. |
| 5,652,308 A | 7/1997 | Merrill et al. |
| 5,670,595 A | 9/1997 | Meka et al. |
| 5,672,668 A | 9/1997 | Winter et al. |
| 5,693,730 A | 12/1997 | Kuber et al. |
| 5,693,836 A | 12/1997 | Winter et al. |
| 5,710,223 A | 1/1998 | Fukuoka et al. |
| 5,723,560 A | 3/1998 | Canich |

(Continued)

FOREIGN PATENT DOCUMENTS

CA 2118711 3/1993

(Continued)

OTHER PUBLICATIONS

Bernhard Wunderlich—Editor, Thermal Analysis, Academic Press Inc., 1990, pp. 418.
Sun et al., Effect of Short Chain Branching on the Coil Dimensions of Polyolefins in Dilute Solution, Macromolecules, 2001, vol. 34, No. 19, pp. 6812-6820.
Resconi et al., Selectivity in Propene Polymerization with Metallocene Catalysts, Chemical Reviews, 2000, vol. 100, No. 4, pp. 1253-1345.
U.S. Appl. No. 11/961,583, entitled Isotactic Polypropylene Produced from Supercritical Polymerization Process, filed Dec. 20, 2007.
U.S. Appl. No. 60/933,007, entitled Super-Solution Homogenous Propylene Polymerization, filed Jun. 4, 2007.
U.S. Appl. No. 12/074,496, filed Mar. 4, 2008, Gabor Kiss et al.
U.S. Appl. No. 60/933,007, filed Jun. 4, 2007, Brant et al.
U.S. Appl. No. 60/937,929, Jun. 29, 2007, Kiss et al.

(Continued)

*Primary Examiner* — Roberto Rabago
(74) *Attorney, Agent, or Firm* — Catherine L. Bell

(57) ABSTRACT

This invention relates to processes for producing an isotactic propylene homopolymer having more than 15 and less than 100 regio defects (sum of 2,1-erythro and 2,1-threo insertions and 3,1-isomerizations) per 10,000 propylene units; a weight-averaged molecular weight of 35000 g/mol or more; a peak melting temperature of greater than 149° C.; an mmmm pentad fraction of 0.85 or more; a heat of fusion of 80 J/g or more; and a peak melting temperature minus peak crystallization temperature (Tmp−Tcp) of less than or equal to (0.907 times Tmp) minus 99.64 (Tmp−Tcp<(0.907×Tmp)−99.64), as measured in ° C. on the homopolymer having 0 wt % nucleating agent.

47 Claims, No Drawings

U.S. PATENT DOCUMENTS

| | | | |
|---|---|---|---|
| 5,723,705 A | 3/1998 | Herrmann et al. | |
| 5,756,608 A | 5/1998 | Langhauser et al. | |
| 5,763,542 A | 6/1998 | Winter et al. | |
| 5,770,753 A | 6/1998 | Kuber et al. | |
| 5,780,565 A | 7/1998 | Clough et al. | |
| 5,840,644 A | 11/1998 | Kuber et al. | |
| 5,866,663 A | 2/1999 | Brookhart et al. | |
| 5,882,750 A | 3/1999 | Mink et al. | |
| 5,936,053 A | 8/1999 | Fukuoka et al. | |
| 5,962,719 A | 10/1999 | Winter et al. | |
| 5,965,674 A | 10/1999 | Moen et al. | |
| 5,969,062 A | 10/1999 | Moll et al. | |
| 5,998,547 A | 12/1999 | Hohner | |
| 6,028,152 A | 2/2000 | Winter et al. | |
| 6,034,022 A | 3/2000 | McAdon et al. | |
| 6,051,522 A | 4/2000 | Rohrmann et al. | |
| 6,057,408 A | 5/2000 | Winter et al. | |
| 6,084,041 A | 7/2000 | Andtsjö et al. | |
| 6,084,115 A | 7/2000 | Chen et al. | |
| 6,087,292 A | 7/2000 | Winter et al. | |
| 6,124,231 A | 9/2000 | Fritze et al. | |
| 6,127,493 A | 10/2000 | Maurer et al. | |
| 6,143,682 A | 11/2000 | Fisher | |
| 6,143,686 A | 11/2000 | Vizzini et al. | |
| 6,153,776 A | 11/2000 | Patton et al. | |
| 6,160,072 A | 12/2000 | Ewen | |
| 6,169,051 B1 | 1/2001 | Mitani et al. | |
| 6,197,910 B1 | 3/2001 | Weng et al. | |
| 6,207,756 B1 | 3/2001 | Datta et al. | |
| 6,218,488 B1 | 4/2001 | Schiffino et al. | |
| 6,225,432 B1 | 5/2001 | Weng et al. | |
| 6,228,795 B1 | 5/2001 | Vizzini | |
| 6,255,410 B1 | 7/2001 | Shigekauzu et al. | |
| 6,268,444 B1 | 7/2001 | Klosin et al. | |
| 6,291,699 B1 | 9/2001 | Birmingham et al. | |
| 6,300,451 B1 | 10/2001 | Mehta et al. | |
| 6,326,493 B1 | 12/2001 | Mitani et al. | |
| 6,355,725 B2 | 3/2002 | Terano et al. | |
| 6,355,741 B1 | 3/2002 | Marechal | |
| 6,359,095 B1 | 3/2002 | Winter et al. | |
| 6,362,356 B1 | 3/2002 | Repo et al. | |
| 6,372,847 B1 | 4/2002 | Wouters | |
| 6,399,723 B1 | 6/2002 | Burkhardt et al. | |
| 6,451,938 B1 | 9/2002 | Fisher et al. | |
| 6,455,638 B2 | 9/2002 | Laughner et al. | |
| 6,458,982 B1 | 10/2002 | Schottek et al. | |
| 6,465,700 B1 | 10/2002 | Sullivan et al. | |
| 6,469,188 B1 | 10/2002 | Miller et al. | |
| 6,479,424 B1 | 11/2002 | Ernst et al. | |
| 6,479,646 B1 | 11/2002 | Nakano et al. | |
| 6,482,902 B1 | 11/2002 | Bohnen et al. | |
| 6,492,473 B1 | 12/2002 | Canich et al. | |
| 6,492,539 B1 | 12/2002 | Bingel et al. | |
| 6,521,727 B2 | 2/2003 | Eilerts et al. | |
| 6,525,157 B2 | 2/2003 | Cozewith et al. | |
| 6,562,914 B1 | 5/2003 | Andtsjö et al. | |
| 6,562,920 B2 | 5/2003 | Brant | |
| 6,576,306 B2 | 6/2003 | Mehta et al. | |
| 6,583,277 B2 | 6/2003 | Luo et al. | |
| 6,620,896 B1 | 9/2003 | Killian et al. | |
| 6,635,779 B1 | 10/2003 | Ewen et al. | |
| 6,642,316 B1 | 11/2003 | Datta et al. | |
| 6,689,847 B2 | 2/2004 | Mawson et al. | |
| 6,737,487 B2 | 5/2004 | Meverden | |
| 6,749,212 B2 | 6/2004 | Mock et al. | |
| 6,770,714 B2 | 8/2004 | Ommundsen et al. | |
| 6,881,800 B2 | 4/2005 | Friedersdorf | |
| 6,969,490 B2 | 11/2005 | Marx et al. | |
| 7,022,780 B2 | 4/2006 | Marx et al. | |
| RE39,156 E | 7/2006 | Winter et al. | |
| 7,087,690 B2 | 8/2006 | Boussie et al. | |
| 7,163,989 B2 | 1/2007 | Friedersdorf | |
| 7,214,746 B2 | 5/2007 | Voskoboynikov et al. | |
| 7,214,747 B2 | 5/2007 | Voskoboynikov et al. | |
| 7,265,193 B2 | 9/2007 | Weng et al. | |
| 7,276,567 B2 | 10/2007 | Voskoboynikov et al. | |
| 7,279,536 B2 | 10/2007 | Brant et al. | |
| 7,319,125 B2 | 1/2008 | Arjunan et al. | |
| 7,351,779 B2 | 4/2008 | Iaccino et al. | |
| 7,354,979 B2 | 4/2008 | Brant et al. | |
| 7,429,634 B2 | 9/2008 | Brant et al. | |
| 7,446,216 B2 | 11/2008 | Voskoboynikov et al. | |
| 7,538,168 B2 | 5/2009 | Voskoboynikov et al. | |
| 7,550,544 B2 | 6/2009 | Voskoboynikov et al. | |
| 7,557,171 B2 | 7/2009 | Voskoboynikov et al. | |
| 7,667,064 B2 | 2/2010 | Voskoboynikov et al. | |
| 7,709,670 B2 | 5/2010 | Voskoboynikov et al. | |
| 7,812,104 B2 * | 10/2010 | Canich et al. | 526/161 |
| 2001/0031834 A1 | 10/2001 | Ushioda et al. | |
| 2001/0044505 A1 | 11/2001 | Ford et al. | |
| 2001/0044506 A1 | 11/2001 | Mehta et al. | |
| 2001/0053833 A1 | 12/2001 | Nakano et al. | |
| 2002/0002261 A1 | 1/2002 | Yahata et al. | |
| 2002/0004575 A1 | 1/2002 | Cozewith et al. | |
| 2002/0013440 A1 | 1/2002 | Agarwal et al. | |
| 2002/0016415 A1 | 2/2002 | Laughner et al. | |
| 2002/0065379 A1 | 5/2002 | Murray | |
| 2002/0096797 A1 | 7/2002 | Stoffelsma et al. | |
| 2002/0156279 A1 | 10/2002 | Boussie et al. | |
| 2002/0176974 A1 | 11/2002 | Hanyu et al. | |
| 2002/0193535 A1 | 12/2002 | Meverden et al. | |
| 2003/0032549 A1 | 2/2003 | Vogel | |
| 2003/0088021 A1 | 5/2003 | Van Dun et al. | |
| 2004/0024146 A1 | 2/2004 | Friedersdorf | |
| 2004/0024148 A1 | 2/2004 | Meverden | |
| 2004/0110910 A1 | 6/2004 | Arjunan | |
| 2004/0122191 A1 | 6/2004 | Arjunan et al. | |
| 2004/0127654 A1 | 7/2004 | Brant et al. | |
| 2004/0132935 A1 | 7/2004 | Arjunan et al. | |
| 2004/0152882 A1 | 8/2004 | Ekhom et al. | |
| 2004/0158010 A1 | 8/2004 | Lehmus et al. | |
| 2004/0158015 A1 | 8/2004 | Senninger | |
| 2004/0242734 A1 | 12/2004 | Lakeman et al. | |
| 2004/0260107 A1 | 12/2004 | Oberhoff et al. | |
| 2005/0009993 A1 | 1/2005 | Morioka et al. | |
| 2005/0042294 A1 | 2/2005 | Thanoo et al. | |
| 2005/0043489 A1 | 2/2005 | Datta et al. | |
| 2005/0090384 A1 | 4/2005 | Wang et al. | |
| 2005/0113522 A1 | 5/2005 | Datta et al. | |
| 2005/0228155 A1 | 10/2005 | Kawai et al. | |
| 2006/0009595 A1 | 1/2006 | Rix et al. | |
| 2006/0025545 A1 | 2/2006 | Brant et al. | |
| 2006/0096175 A1 | 5/2006 | Russell et al. | |
| 2006/0134221 A1 | 6/2006 | Geall | |
| 2006/0135699 A1 | 6/2006 | Li et al. | |
| 2006/0167195 A1 | 7/2006 | Resconi et al. | |
| 2006/0178491 A1 | 8/2006 | Canich | |
| 2006/0183861 A1 | 8/2006 | Harrington et al. | |
| 2006/0183881 A1 | 8/2006 | Ibar | |
| 2006/0211832 A1 | 9/2006 | Brant et al. | |
| 2006/0281868 A1 | 12/2006 | Datta et al. | |
| 2006/0293474 A1 | 12/2006 | Brant et al. | |
| 2007/0021566 A1 | 1/2007 | Tse et al. | |
| 2007/0135596 A1 | 6/2007 | Voskoboynikov et al. | |
| 2007/0135597 A1 | 6/2007 | Voskoboynikov et al. | |
| 2007/0135623 A1 | 6/2007 | Voskoboynikov et al. | |
| 2007/0255018 A1 | 11/2007 | Brant | |
| 2008/0090974 A1 | 4/2008 | Brant et al. | |
| 2008/0153996 A1 | 6/2008 | Friedersdorf et al. | |
| 2008/0153997 A1 | 6/2008 | Casty et al. | |
| 2008/0188635 A1 | 8/2008 | Brant et al. | |
| 2008/0211832 A1 | 9/2008 | Kumon | |
| 2008/0214767 A1 * | 9/2008 | Mehta et al. | 526/351 |
| 2008/0234443 A1 | 9/2008 | Kiss et al. | |
| 2008/0281040 A1 | 11/2008 | Kiss et al. | |
| 2009/0076214 A1 | 3/2009 | Kiss et al. | |
| 2009/0076216 A1 | 3/2009 | Kiss et al. | |
| 2009/0163642 A1 | 6/2009 | Kiss et al. | |
| 2009/0163643 A1 * | 6/2009 | Kiss et al. | 524/528 |
| 2009/0163678 A1 | 6/2009 | Kiss et al. | |
| 2009/0186995 A1 | 7/2009 | Canich et al. | |
| 2009/0292085 A1 | 11/2009 | Kiss et al. | |
| 2010/0042379 A1 | 2/2010 | Minnaar et al. | |
| 2010/0063338 A1 | 3/2010 | Kiss et al. | |

FOREIGN PATENT DOCUMENTS

| | | |
|---|---|---|
| CA | 2103694 | 2/1994 |
| DE | 300291 | 3/1988 |
| EP | 0 089 691 | 9/1983 |
| EP | 0 129 368 | 12/1984 |
| EP | 0 416 815 | 3/1991 |
| EP | 0 480 190 | 4/1992 |
| EP | 0 459 320 | 11/1992 |
| EP | 0 517 183 | 12/1992 |
| EP | 0 530 908 | 3/1993 |
| EP | 0 552 945 | 7/1993 |
| EP | 0 577 581 | 1/1994 |
| EP | 0 582 195 | 2/1994 |
| EP | 0 584 609 | 3/1994 |
| EP | 0 603 232 | 6/1994 |
| EP | 0 628 566 | 12/1994 |
| EP | 0 645 401 | 3/1995 |
| EP | 0 666 267 | 8/1995 |
| EP | 0 667 359 | 8/1995 |
| EP | 0 670 325 | 9/1995 |
| EP | 0 693 502 | 1/1996 |
| EP | 0 714 923 | 6/1996 |
| EP | 0 718 324 | 6/1996 |
| EP | 0 742 227 | 11/1996 |
| EP | 0 806 436 | 11/1997 |
| EP | 0 846 696 | 6/1998 |
| EP | 0 882 078 | 12/1998 |
| EP | 0 882 731 | 12/1998 |
| EP | 0 887 379 | 12/1998 |
| EP | 0 887 380 | 12/1998 |
| EP | 0 942 017 | 9/1999 |
| EP | 0 957 113 | 11/1999 |
| EP | 0 987 279 | 3/2000 |
| EP | 1 008 607 | 6/2000 |
| EP | 1 033 371 | 9/2000 |
| EP | 1 138 687 | 10/2001 |
| EP | 1 193 275 | 4/2002 |
| EP | 1 195 391 | 4/2002 |
| EP | 1 231 226 | 8/2002 |
| EP | 1 323 746 | 7/2003 |
| GB | 1 443 394 | 7/1976 |
| JP | 06-025357 | 2/1994 |
| JP | 07-216011 | 8/1995 |
| JP | 08-127612 | 5/1996 |
| JP | 3323347 | 7/1996 |
| JP | 08-208535 | 8/1996 |
| JP | 08-301914 | 11/1996 |
| JP | 09-216916 | 8/1997 |
| JP | 10-045834 | 2/1998 |
| JP | 10-110003 | 4/1998 |
| JP | 10-176023 | 6/1998 |
| JP | 11-001508 | 1/1999 |
| JP | 11-060588 | 3/1999 |
| JP | 11-080183 | 3/1999 |
| JP | 11-171925 | 6/1999 |
| JP | 2001-206914 | 7/2001 |
| JP | 3421202 | 4/2003 |
| PL | 281277 | 3/1991 |
| PL | 159518 | 3/1992 |
| WO | WO 88/02376 | 4/1988 |
| WO | WO 88/04672 | 6/1988 |
| WO | WO 91/04257 | 4/1991 |
| WO | WO 92/14766 | 9/1992 |
| WO | WO 93/05082 | 3/1993 |
| WO | WO 93/11171 | 6/1993 |
| WO | WO 94/00500 | 1/1994 |
| WO | WO 95/04087 | 2/1995 |
| WO | WO 95/25757 | 9/1995 |
| WO | WO 96/00246 | 1/1996 |
| WO | WO 96/04317 | 2/1996 |
| WO | WO 96/12744 | 5/1996 |
| WO | WO 96/18662 | 6/1996 |
| WO | WO 96/33227 | 10/1996 |
| WO | WO 96/34023 | 10/1996 |
| WO | WO 96/38458 | 12/1996 |
| WO | WO 97/03124 | 1/1997 |
| WO | WO 97/11098 | 3/1997 |
| WO | WO 97/13790 | 4/1997 |
| WO | WO 97/44391 | 11/1997 |
| WO | WO 97/45434 | 12/1997 |
| WO | WO 97/48737 | 12/1997 |
| WO | WO 98/13393 | 4/1998 |
| WO | WO 98/33823 | 8/1998 |
| WO | WO 98/49229 | 11/1998 |
| WO | WO 99/11680 | 3/1999 |
| WO | WO 99/26985 | 6/1999 |
| WO | WO 99/29749 | 6/1999 |
| WO | WO 99/40129 | 8/1999 |
| WO | WO 99/41289 | 8/1999 |
| WO | WO 99/42467 | 8/1999 |
| WO | WO 99/43717 | 9/1999 |
| WO | WO 99/61488 | 12/1999 |
| WO | WO 00/06621 | 2/2000 |
| WO | WO 00/12565 | 3/2000 |
| WO | WO 00/12572 | 3/2000 |
| WO | WO 00/25916 | 5/2000 |
| WO | WO 00/26266 | 5/2000 |
| WO | WO 00/37514 | 6/2000 |
| WO | WO 00/40625 | 7/2000 |
| WO | WO 00/43406 | 7/2000 |
| WO | WO 00/50475 | 8/2000 |
| WO | WO 00/64952 | 11/2000 |
| WO | WO 00/69871 | 11/2000 |
| WO | WO 01/44318 | 6/2001 |
| WO | WO 01/46273 | 6/2001 |
| WO | WO 01/57095 | 8/2001 |
| WO | WO 02/00744 | 1/2002 |
| WO | WO 02/34795 | 5/2002 |
| WO | WO 02/38628 | 5/2002 |
| WO | WO 02/44260 | 6/2002 |
| WO | WO 02/50145 | 6/2002 |
| WO | WO 02/070572 | 9/2002 |
| WO | WO 02/083753 | 10/2002 |
| WO | WO 02/090399 | 11/2002 |
| WO | WO 02/098930 | 12/2002 |
| WO | WO 03/040095 | 5/2003 |
| WO | WO 03/040195 | 5/2003 |
| WO | WO 03/040201 | 5/2003 |
| WO | WO 03/040202 | 5/2003 |
| WO | WO 03/040233 | 5/2003 |
| WO | WO 03/040442 | 5/2003 |
| WO | WO 2004/013194 | 2/2004 |
| WO | WO 2004/024740 | 3/2004 |
| WO | WO 2004/026921 | 4/2004 |
| WO | WO 2004/026923 | 4/2004 |
| WO | WO 2004/026925 | 4/2004 |
| WO | WO 2004/033510 | 4/2004 |
| WO | WO 2004/050724 | 6/2004 |
| WO | WO 2004/052950 | 6/2004 |
| WO | WO 2004/060941 | 7/2004 |
| WO | WO 2005/113610 | 12/2005 |
| WO | WO 2005/113615 | 12/2005 |
| WO | WO 2006/002132 | 1/2006 |
| WO | WO 2006/009942 | 1/2006 |
| WO | WO 2006/009944 | 1/2006 |
| WO | WO 2006/009945 | 1/2006 |
| WO | WO 2006/009946 | 1/2006 |
| WO | WO 2006/009949 | 1/2006 |
| WO | WO 2006/009951 | 1/2006 |
| WO | WO 2006/009976 | 1/2006 |
| WO | WO 2006/009977 | 1/2006 |
| WO | WO 2006/009979 | 1/2006 |
| WO | WO 2006/009980 | 1/2006 |
| WO | WO 2006/009981 | 1/2006 |
| WO | WO 2006/019494 | 2/2006 |
| WO | WO 2006/025917 | 3/2006 |
| WO | WO 2006/025949 | 3/2006 |
| WO | WO 2006/028549 | 3/2006 |
| WO | WO 2006/044149 | 4/2006 |
| WO | WO 2006/083303 | 8/2006 |
| WO | WO 2006/097497 | 9/2006 |
| WO | WO 2006/097500 | 9/2006 |
| WO | WO 2006/120177 | 11/2006 |
| WO | WO 2006/130046 | 12/2006 |
| WO | WO 2006/134046 | 12/2006 |
| WO | WO 2007/037944 | 4/2007 |

| WO | WO 2007/107448 | 9/2007 |
| --- | --- | --- |
| WO | WO 2007/116034 | 10/2007 |
| WO | WO 2009/082468 | 7/2009 |

OTHER PUBLICATIONS

U.S. Appl. No. 61/004,336, filed Nov. 27, 2007, Deffenbaugh et al.
Author Unknown, "Propylene Supercritical Polymerization Tests in Yangzi Make Breakthrough" China Chemical Reporter, vol. 15, Apr. 6, 2005.
Alt et al., Effect of the Nature of Metallocene Complexes of Group IV Metals on Their Performance in Catalytic Ethylene and Propylene Polymerization, Chem. Rev. 100, 2000, pp. 1205-1221.
Alt et al., Syndiospecific Polymerization of Propylene: Synthesis of $CH_2$- and CHR-Bridged Fluorenyl-Containing Ligand Precursors for Metallocene Complexes of Type $(C_{13}H_{8-n}R'_nCHR-C_5H_4)ZrCl_2$ (n=0, 2; R=H, Alkyl; R'=H, Hal), Journal of Organometallic Chemistry, 1996, vol. 526, No. 2, pp. 295-301.
Alt et al., Syndiospezifische Polymerisation von Propylen: 2- und 2,7-substituierte Metallocenkomplex des typs $(C_{13}H_{8-n}R_nCR'_2C_5H_4)$ $MCl_2$(n=1,2; R=Alkoxy, Alkyl, Aryl, Hal; R'=Me, Ph; M=Zr, Hf)[1], Journal of Organometallic Chemistry, 1996, vol. 522, No. 1, pp. 39-54.
Akimoto et al., New Developments in the Production of Metallocene LLDPE by High pressure Polymerization, Tosoh Corp., Metallocene-Based Polyolefins 2000 (conference proceedings), pp. 287-308 (John Wiley & Sons Ltd.).
Bandy et al., Polymerisation of Ethylene and Propene Using New chiral Zirconium Derivatives, Crystal Structure of $[ZrL^1Cl_2][H_2L^1=(4S,5S)$-trans-4,5-bis(1H-inden-1-ylmethyl)-2,2-dimethyl-1,3-dioxoland], J. Chem. Soc., Dalton Trans., 1991, pp. 2207-2216.
Barnhart et al., Synthesis of Branched Polyolefins Using a Combination of Homogeneous Metallocene Mimics, J. Am. Chem. Soc., 1998, vol. 120, pp. 1082-1083.
Bergemann et al., Copolymerization of Ethylene and Linear α-Olefins with a Metallocene Catalyst System under High Pressure, Part II. Comparison of Propene, 1-Butene, 1-Hexene, and 1-Decene, J. Mol. Catal. A: Chemical 105, 1996, pp. 87-91.
Bergemann et al., Copolymerization of Ethylene and 1,5-Hexadiene Under High Pressure Catalyzed by a Metallocene, Journal of Molecular Catalysis A: Chemical, 116, 1997, pp. 317-322.
Bergemann et al., Journal of Molecular Catalysis A: Chemical 102, 1995, pp. 1-5.
Britovsek et al., The Search for New-Generation Olefin Polymerization Catalysts: Life Beyond Metallocenes, Chemie Intl. Edn., 1999, vol. 38, pp. 428-447.
Bujadoux, Use of Bridged and Non-Bridged Metallocene Catalysts in High Pressure/High Temperature Ethylene/α-Olefin Copolymerization, Metallocenes 95 Intl. Congr., Metallocene Polym., 1995, pp. 375-402, Scotland Bus. Rsrch. Publ.
Chen et al., Cocatalysts for Metal-Catalyzed Olefin Polymerization: Activators, Activation Processes, and Structure-Activity Relationships, Chem. Rev., 2000, vol. 100, pp. 1391-1434.
Coates, et al., Oscillating Stereocontrol: A Strategy for the Synthesis of Thermoplastic Elastomeric Polypropylene, Science, 1995, vol. 267, pp. 217-219.
Coates, Precise Control of Polyolefin Stereochemistry Using Single Site Metal Catalysts, Chem. Rev. 100, 2000, pp. 1223-1252.
Conway et al., Formation and Reactivity of Halogen Derivatives of (η5-Cyclopentadienyl)thallium, Organometallics, 1985, vol. 4, pp. 688-693.
Cottom, Waxes, in Encyclo. Chem. Tech., vol. 25, pp. 614-626, 4th Ed.
Dassaud et al., Copolymerization of Propene-Nonconjugated Dienes: Derivatization Through Hydroboration and Epoxydation, Polym. Adv. Technol., 4(7), 1993, pp. 457-464.
Dreier, et al., 2-Hetaryl-Substituted Bis(indenyl)zirconium Complexes as Catalyst Precursors for Elastomeric Polypropylene Formation, Organometallics, 2000, vol. 19, pp. 4095-4103.
Dreier, et al., Group 4 Metallocenes Containing Hetaryl Substituents at Their π-ligands: Synthesis and Characterization of the Parent bis[2-(2-furyl)indenyl]zirconocene system, J. Organometallic Chem., 2001, vol. 622, pp. 143-148.

Dreier, et al., Conformational features of a furyl-substituted bis(tetrahydroindynyl)zirconium dichloride system, J. Phys. Org. Chem., 2002, vol. 15, pp. 582-589.
Dreier et al., Structural and Dynamic Features of Bis[2-(2-furyl)indenyl]zirconium Derivatives, Organometallics, 2001, vol. 20, pp. 5067-5075.
Eckstein et al., Determination of Plateau Moduli and Entanglement Molecular Weights of Isotactic, Syndiotactic, and Atactic Polypropylenes Synthesized with Metallocene Catalysts, Macromolecules, 31, 1998, pp. 1335-1340.
Erker et al., Hydroboration of Bis(alkenylcyclopentadienyl)zirconium Dichlorides), Chemische Berichte, 1991, vol. 124, pp. 1301-1310.
Erker et al., Cp-Substituent Additivity Effects controlling the Stereochemistry of the Propene Polymerization Reaction at Conformationally Unrestricted $(Cp-CHR^1\ R^2)_2ZrCl_2$/Methylalumoxane Catalysts, J. Am. Chem. Soc., 1991, vol. 113, pp. 7594-7602.
Erker et al., Synthesis of ansa-Metallocenes by Intramolecular Photochemical [2+2] Cycloaddition of Bis(alkenylcyclopentadienyl)zirconium Complexes, Organometallics, 1993, vol. 12, pp. 2140-2151.
Ewen et al., Syndiospecific Propylene Polymerizations with Group 4 Metallocenese, J. Am. Chem. Soc., 1988, vol. 110, pp. 6255-6256.
Finch et al., Substituent Effects on the cleavage Rates of Titanocene Metallacyclobutanes, Journal of the American Chemical Society, Washington, DC, US, 1998, vol. 110, pp. 2406-2413.
Gotz et al., MAO-Free Metallocene Based Catalysts in High Pressure Polymerization of Ethylene and 1-Hexene, Chem. Eng. Technol., 21, 1998, pp. 954-957 (Wiley-VCH Verlag GmbH).
Hackmann et al., functional Olefin Copolymers: Uniform Architectures of Propene/7-Methyl-1,6-Octadiene Copolymers by ATR-FTIR Spectroscopy Control of Monomer Composition, Macromolecules, American Chemical Society, Easton, US, vol. 33, No. 5, Mar. 7, 2000, pp. 1524-1529 (German).
Hackmann et al., Zirconocene-MAO Catalyzed Homo- and Copolymerizations of Linear Assymetrically Substituted Dienes with Propene: A Novel Strategy of Functional (co)poly(α-olefin)s, Macromol. Chem. Phys., 1998, pp. 1511-1517 (German).
Han et al., Permercuration of Ferrocenes and Ruthenocenes. New Approaches to Complexes Bearing Perhalogenated Cyclopentadienyl Ligands, Organometallics, 1994, vol. 13, No. 8, pp. 3009-3019.
Hassan et al., Aryl-Aryl Bond Formation One Century after the Discovery of the Ullmann Reaction, Chem. Rev., 2002, vol. 102, pp. 1359-1469.
Hauptman, et al., Stereoblock Polypropylene: Ligand Effects on the Stereospecificity of 2-Arylindene Zirconocene Catalysts, J. Am. Chem. Soc., 1995, vol. 117, pp. 11586-11587.
Hollis et al., Preparation and Properties of (S,S)-[Ti((R,R)-cyclacene)C12], a Chiral Strapped Bent Metallocene, Organometallics, 1992, vol. 11, pp. 2812-2816.
Ittel, et al., Late metal Catalysts for Ethylene Homo- and Copolymerization, Chem. Rev. 2000, vol. 100, pp. 1169-1203.
Janiak, Metallocene Catalysts for Olefin Polymerization, Metallocenes: Synthesis, Reactivity, and Applications, vol. 2, Wiley-VCH, 1998, pp. 547-614, A. Togni and R. L. Halterman, editors.
Johnston et al., Investigation of the Electrochemical Properties of Substituted Titanocene Dichlorides, Electrochemica Acta, 1995, vol. 40, pp. 473-477.
Kamigaito et al., Olefin Polymerization with Me4Cp-amido Complexes with Electron-withdrawing Groups, Journal of Polymer Science, Part A: Polymer Chemistry, 2000, vol. 38, No. S1, pp. 4649-4660.
Kato et al., Synthesis of Novel ansa-Metallocene Complex with Bridged Bis(indenyl) Ligand and Its Application for Olefin Polymerization, Studies in Surface and Catalysis, 1999, vol. 121 (Science and Technology in Catalysis (1998), pp. 473-476.
Kirby et al., Phase Behavior of Polymers in Supercritical Fluid Solvents, Chem. Rev., 1999, 99, pp. 565-602.
Knüppel, et al., Probing the Dynamic Features of Bis(aminocyclopentadienyl) and Bis(aminoindenyl) Zirconium Complexes, Organometallics, 2000, vol. 19, pp. 1262-1268.

Kravchenko, et al., Propylene Polymerization with Chiral and Achiral Unbridged 2-Arylindene Metallocenes, Organometallics, 1997, vol. 16, pp. 3635-3639.

Lee et al., Copolymerization of Olefins and Dienes with Homogeneous and Heterogeneous Catalysts, Eur. Polym. J., vol. 33(4), 1997, pp. 447-451 (German).

Lehmus et al., Metallocene-PP Produced Under Supercritical Polymerization Conditions, http://www.chemistry.unina.it/jlpo/bluesky/first_bluesky/list_of_posters.htm pp. 1-10.

Linnolahti et al., Theoretical Study on the Factors Controlling the Accessibility of Cationic Metal Centers in Zirconocene Polymerization Catalysts, Macromolecules, 2000, vol. 33, pp. 9205-9214.

Lofgren et al., Metallocene-PP Produced Under Supercritical Conditions, 1$^{st}$ Blue Sky Conference on Catalytic Olefin Polymerization, Jun. 17-20, 2002, Sorrento, Italy, 2002.

Luft, Development of Metallocene Catalysts and Their Application in the High Pressure Polymerisation Process, Darmstadt University of Technology, PE 1999, World Congress Global Technology Update Forum, Mar. 15-16, 1999, Zurich, Switzerland.

Ogasawara et al., Metathesis Route to Bridged Metallocenes, J. Am. Chem. Soc., 2002, vol. 124, pp. 9068-9069.

Piccolrovazzi et al., Electronic Effects in Homogeneous Indenylzirconium Ziegler-Natta Catalysts, Organometallics, 1990, vol. 9, No. 12, pp. 3098-3105.

Plenio, et al., Aminozirconocenes: A New class of Zirconocenese with a Nitrogen Atom Directly Bonded to an $\eta^5$-cyclopentadienyl (indenyl) ligand, J. Organometallic Chem., 1996, vol. 519, pp. 269-272.

Rausch et al., The Formation of Ring-substituted Titanocene Derivatives Containing Chloro and Carbomethoxy Substituents, Journal of Organometallic Chemistry, Elsevier-Sequoia S.A. Lausanne, CH, Dec. 20, 1988, vol. 358, No. 103, pp. 161-168.

Resconi et al., Selectivity in Propene Polymerization with Metallocene Catalysts, Chem. Rev. 2000, vol. 100, pp. 1253-1345.

Resconi et al., Highly Regiospecific Zirconocene Catalysts for the Isospecific Polymerization of Propene, J. Amer. Chem. Soc., 1998, 120, pp. 2308-2321.

Resconi et al., rac-[Methylene(3-tert-butyl-1-indenyl)$_2$]ZrCl$_2$: A Simple, High-Performance Zirconocene Catalyst for Isotactic Polypropene, Organometallics, 2000, 19, pp. 420-429.

Rheingold et al., Preparation and Properties of Chiral Titanocene and Zirconocene Dichloride Complexes of a Chiral Ligand, Organometallics, 1992, vol. 11, pp. 1869-1876.

Ryabov et al., Zirconium Complexes with Cyclopentadienyl Ligands Involving Fused a thiophene Fragment, Organometallics, 2002, vol. 21, pp. 2842-2855.

Schäfer et al., ansa-Metallocene Derivatives, XII. Diastereomeric Derivatisation and Enantiomer Separation of Ethylenebis (Tetrahydroindenyl)-Titanium and -Zirconium Dichlorides, Journal of Organometallic Chemistry, 1987, vol. 328, No. 1-2, pp. 87-99.

Schaverien et al., Ethylene Bis(2-Indenyl)Zirconocene: A New Class of Diastereomeric Metallocenes for the (Co) Polymerization of Alpha-Olefins, Organometallics, vol. 20, No. 16, 2001, pp. 3436-3452.

Schmid et al., Unbridged Cyclopentadienyl-fluorenyl Complexes of Zirconium as Catalysts for Homogeneous Olefin Polymerization, Journal of Organometallic Chemistry, 1995, vol. 501, No. 1-2, pp. 101-106.

Scollard et al., Polymerization of α-Olefins by Chelating Diamid Complexes of Titanium, Macromolecules, 1996, vol. 29, pp. 5241-5243.

Siedle et al., Synthesis of Unsymmetrical Ansa-Fluorenyl Metallocenes, Journal of Molecular Catalysis, 2004, vol. 214, No. 2, pp. 187-198.

Smith et al., Thermodynamic Data for Pure Compounds Part A, Hydrocarbons and Ketones Physical Sciences Data, vol. 25, Elsevier, New York, 1986, pp. 308-309.

Spalek et al., The Influence of Aromatic Substituents on the Polymerization Behavior of Bridged Zirconocene Catalysts, Organometallics, 1994, 13, pp. 954-963.

Stephenson et al., Handbook of the Thermodynamics of Organic Compounds, Elsevier Science Publ. NY, p. 75.

Stratton, Waxes, in Encyclo. Polymer Science and Eng., vol. 17, pp. 784-795, 2$^{nd}$ Edition.

Suzuki et al., Olefin Polymerization Using Highly Congested ansa-Metallocene under High Pressure: Formation of Superhigh Molecular Weight Polyolefins, Macromolecules, 2000, vol. 33, pp. 754-759.

Yamasaki et al., Novel High performance ansa-Zirconocene Catalysts for Isospecific Polymerization of Propylene, Chem. Letters, 1999, pp. 1311-1312.

Yano et al., Homo- and Copolymerization of Ethylene at High Temperature with Cationic Zirconocene Catalysts, Macromol. Chem. Phys. 200, No. 4, pp. 917-923 (Wiley-VCH Verlag GmbH, 1999).

Yano et al., Homo- and Copolymerization of Ethylene at by Cationic Hafnocene Catalysts based on Tetrakis(pentafluorophenyl), Macromol. Chem. Phys. 200, No. 4, 1999, pp. 924-932 (Wiley-VCH Verlag GmbH).

Yano et al., Novel Zirconocene Catalysts for the Production of High Molecular Weight LLDPE in High Temperature Polymerization, Macromol. Chem. Phys. 200, No. 4, 1999, pp. 933-941 (Wiley-VCH Verlag GmbH).

Yano et al., Ethylene/1-Hexene Copolymerization with Ph$_2$C(Cp)(Flu)ZrCl$_2$ Derivatives: Correlation Between Ligand Structure and Copolymerization Behavior at High Temperature, Macromolecular Chemistry and Physics, 1999, vol. 200, No. 6, pp. 1542-1553.

Waldbaum et al., Novel Organoiron Compounds Resulting From the Attempted Syntheses of Dibenzofulvalene Complexes, Inorganica Chimica Acta, 1999, vol. 291, No. 1-2, pp. 109-126.

Walther et al., Metallocene-Catalyzed Polymerisation in Supercritical Propylene, Sep. 22-25, 2002, Venice, Italy, High Pressure in Venice, 4$^{th}$ International Symposium on High Pressure Process Technology and Chemical Engineering.

Wild et al., ansa-Metallocene Derivatives, IV, Synthesis and Molecular Structures of Chiral ansa-Titanocene Derivatives with Bridged Tetrahydroindenyl Ligands, Journal of Organometallic Chemistry, 1982, vol. 232, pp. 233-247.

Author Unknown, Operation of the Reactor with a Sealed Electric Motor in Manufacture of Ditolyethane, 1965.

Lahelin et al., Propylene Polymerization with rac-SiMe$_2$(2-ME-4-PhInd)$_2$ZrMe$_2$/MAO: Polymer Characterization and Kinetic Models, Macromol. Chem. Phys., 2003, v. 204, pp. 1323-1337.

Larsonneur et al., Synthesis, Characterization, and Chemical Reactivity of Zirconium Dihydride [(C$_5$H$_4$R)$_2$Zr(µ-H)H]$_2$ (R=SiMe$_3$, CMe$_3$). H/D Exchange Reactions of Anionic Species [(C$_5$H$_4$R)$_2$ZrH$_2$]$^-$. X-ray Crystal Structure of [(C$_5$H$_4$SiMe$_3$)$_2$Zr(µ-H)H]$_2$, Organometallics, 1993, vol. 12, pp. 3216-3224.

Wunderlich, Editor, Thermal Analysis, Academic Press Inc., 1990, pp. 418.

Han et al., How to Solute Polydispersity Affects the Cloud-Point and Coexistence Pressures in Propylene and Ethylene Solutions of Alternating Poly(ethylene-co-propylene), Ind. Eng. Chem. Res., 1997, vol. 36, No. 12, pp. 5520-5525.

Koak et al., High-Pressure Phase Behavior of the Systems Polyethylene+Ethylene and Polybutene+1-butene, Fluid Phase Equilibria, 1999, vol. 158-160, pp. 835-846.

Nadella et al., Melt Spinning of Isotactic Polypropylene: Structure Development and Relationship to Mechanical Properties, Journal of Applied Polymer Science, 1977, vol. 21, No. 11, pp. 3003-3022.

Resconi et al., Effect of Monomer Concentration on Propene Polymerization with the rac-[Ethylenebis(1-indenyl)]zirconium Dichloride/Methylaluminoxane Catalyst, Macromolecules, 1995, vol. 28, No. 19, pp. 6667-6676.

Seraidaris et al., Copolymerization of Propane with Low Amounts of Ethene in Propene Bulk Phase, Polymer, 2006, vol. 47, No. 1, pp. 107-112.

* cited by examiner

SUPER-SOLUTION HOMOGENEOUS PROPYLENE POLYMERIZATION AND POLYPROPYLENES MADE THEREFROM

PRIORITY CLAIM

This application claims the benefit of and priority from and is a continuation-in-part of U.S. Ser. No. 12/016,346 filed on Jan. 18, 2008 and granted as U.S. Pat. No. 7,812,104 on Oct. 12, 2010.

CROSS-REFERENCE TO RELATED APPLICATIONS

This application relates to U.S. Pat. No. 7,279,536, issued Oct. 9, 2007; U.S. patent application Ser. No. 11/961,583, filed Dec. 20, 2007, U.S. Pat. No. 7,807,769, published as U.S. Patent Publication No. 2008/0214767 on Sep. 4, 2008; and U.S. patent application Ser. No. 12/098,907, filed Apr. 7, 2008, U.S. Pat. No. 8,058,371, published as U.S. Patent Publication No. 2008/0188635 on Aug. 7, 2008.

FIELD OF THE INVENTION

The present invention relates to a process for producing propylene polymers and propylene polymers made by such a process.

BACKGROUND OF THE INVENTION

Since the mid-1980s metallocene catalysts have been used in high-pressure reactors-mainly for producing ethylene-backbone polymers including ethylene copolymers with monomers of one or more of propylene, butene, and hexene, along with other specialty monomers such as 4-methyl-1,5-hexadiene. For example U.S. Pat. No. 5,756,608, granted to Langhausen et al., reports a process for polymerizing $C_2$ to $C_{10}$ 1-alkenes using bridged metallocene catalysts. Polypropylene production in high pressure conditions has, however, been seen as impractical and unworkable at temperatures much above the propylene critical point. A process to produce commercially useful polypropylene in a high pressure system would provide advantages, such as increased reactivity, or increased catalyst productivity, or higher throughput, or shorter residence times, etc. Likewise new polypropylene polymers are also in constant need for the preparation of new and improved products. Thus there is a need in the art to develop new processes capable of greater efficiency and manufacture of new polypropylene polymers.

Supercritical propylene polymerization under relatively mild conditions using supported Ziegler-Natta and metallocene catalysts has been described. Likewise, processes for preparing ethylene copolymers with α-olefins in which polymerization is carried out at a pressure between 100-350 MPa and at a temperature from 200-280° C. using a catalyst based on a tetramethylcyclopentadienyl titanium complex is also known.

Olefin polymerization catalysts for use at polymerization temperatures exceeding the melting point temperature and approaching the polymer decomposition temperature are said to yield high productivity have also been described.

Continuous polyolefin production processes using a metallocene catalyst system and maintain at a pressure below the system's cloud-point pressure creating a polymer-rich and a monomer-rich phase and maintain the mixture's temperature above the polymer's melting point have also been described.

Numerous other publications address various aspects of polyolefin polymerization in an attempt to produce either new polyolefin products or to more efficiently produce products that compete with conventional polyolefin products. Nevertheless there is a need to provide processes that mitigate the costs by for example providing polymers that reduce the need for off-line compounding and rheology treatment to adjust the melt characteristics. At the same time, such a process should not compromise product and/or blend performance by providing propylene polymers that have a desirably narrow difference between the melting and crystallization peak temperatures. Process conditions and catalysts that are capable of providing such relatively high molecular weight polypropylene at more cost-effective lower monomer concentrations and milder temperatures and pressures are still needed in the art.

SUMMARY OF THE INVENTION

This invention relates to a continuous process to produce polypropylene comprising contacting propylene in a reactor at 80 to 150° C. and 6.9 to 34.5 MPa, in the presence of an activator and a metallocene represented by the formula:

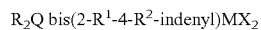

$R_2Q\ bis(2\text{-}R^1\text{-}4\text{-}R^2\text{-}indenyl)MX_2$ wherein each R is, independently, hydrogen or a $C_1$ to $C_{20}$ hydrocarbyl group, Q is Si, C, CH—CH, or CH—$CH_2$, $R^1$ is a $C_1$ to $C_{12}$ linear, branched or cyclic alkyl group, each $R^2$ is, independently, a naphthyl, substituted phenyl or substituted naphthyl group, M is Hf or Zr and X is a halide or a $C_1$ to $C_{20}$ hydrocarbyl group, wherein 15 to less than 35 wt % propylene monomer, and 85 wt % to more than 65 wt % solvent, based on total weight of propylene monomer and solvent, is fed into the polymerization reactor, and the polymerization occurs at a temperature above the solid-fluid phase transition temperature of the polymerization system and above a pressure greater than 1 MPa below the cloud point pressure of the polymerization system, provided however that the polymerization occurs: (1) at a temperature below the critical temperature of the polymerization system, or (2) at a pressure below the critical pressure of the polymerization system, recovering an isotactic propylene homopolymer having:

1) more than 15 and less than 100 regio defects (sum of 2,1-erythro and 2,1-threo insertions and 3,1-isomerizations) per 10,000 propylene units;
2) an Mw (weight average molecular weight) of 35,000 g/mol or more;
3) a peak melting temperature of greater than 149° C.;
4) an mmmm pentad fraction of 0.85 or more;
5) a heat of fusion of 80 J/g or more; and
6) a peak melting temperature minus peak crystallization temperature (Tmp−Tcp) of less than or equal to (0.907 times Tmp) minus 99.64 (Tmp−Tcp≦(0.907×Tmp)−99.64), as measured in ° C. on the homopolymer having 0 wt % nucleating agent.

Definitions

A catalyst system is defined to be the combination of one or more catalyst compounds and one or more activators. The term "catalyst compound" is used interchangeably herein with the terms "catalyst," "catalyst precursor," and "catalyst precursor compound."

A dense fluid is a liquid or supercritical fluid having a density of at least 300 kg/m³.

The solid-fluid phase transition temperature is defined as the temperature below which a solid polymer phase separates from the homogeneous polymer-containing fluid medium at a given pressure. The solid-fluid phase transition temperature can be determined by temperature reduction at constant pressure starting from temperatures at which the polymer is fully dissolved in the fluid medium. The phase transition is observed as the system becoming turbid, when measured using the method described below for determining cloud point.

The solid-fluid phase transition pressure is defined as the pressure below which a solid polymer phase separates from the polymer-containing fluid medium at a given temperature. The solid-fluid phase transition pressure is determined by pressure reduction at constant temperature starting from pressures at which the polymer is fully dissolved in the fluid medium. The phase transition is observed as the system becoming turbid, when measured using the method described below for determining cloud point.

The fluid-fluid phase transition temperature is defined as the temperature below which two fluid phases—a polymer-rich phase and a monomer rich phase—form at a given pressure. The fluid-fluid phase transition temperature can be determined by temperature reduction at constant pressure starting from temperatures at which the polymer is fully dissolved in the fluid medium. The phase transition is observed as the system becoming turbid, when measured using the method described below for determining cloud point.

The fluid-fluid phase transition pressure or cloud point is defined as the pressure below which two fluid phases—a polymer-rich phase and a monomer rich phase—form at a given temperature. The fluid-fluid phase transition pressure can be determined by pressure reduction at constant temperature starting from pressures at which the polymer is fully dissolved in the fluid medium. The phase transition is observed as the system becomes turbid as described in J. Vladimir Oliveira, C. Dariva and J. C. Pinto, Ind. Eng, Chem. Res. 29, 2000, 4627. For purposes of this invention and the claims thereto, the cloud point is measured by shining a helium-neon laser through the selected polymerization system in a cloud point cell onto a photocell and recording the pressure at the onset of rapid increase in light scattering for a given temperature. Cloud point pressure is the point at which at a given temperature, the polymerization system becomes turbid. Cloud point temperature is the point at which at a given pressure, the polymerization system becomes turbid. It should be noted that although both the cloud point pressure and cloud point temperature are well-defined physical properties, in the area of polymer engineering, "cloud point" typically refers to the cloud point pressure.

A higher α-olefin is defined to be an α-olefin having 4 or more carbon atoms.

The use of the term "polymerization" encompasses any polymerization reaction such as homopolymerization and copolymerization. A copolymerization encompasses any polymerization reaction of two or more monomers.

The new numbering scheme for the Periodic Table Groups is used as published in Chemical and Engineering News, 63(5), 27 (1985).

When a polymer or oligomer is referred to as comprising an olefin, the olefin present in the polymer or oligomer is the polymerized or oligomerized form of the olefin. An oligomer is defined to be compositions having 2-120 monomer units. A polymer is defined to be compositions having 121 or more monomer units.

A polymerization system is defined to be monomer(s) plus comonomer(s) plus polymer(s) plus optional inert solvent(s)/diluent(s) plus optional scavenger(s). Note that for the sake of convenience and clarity, the catalyst system is always addressed separately in the present discussion from other components present in a polymerization reactor. In this regard, the polymerization system is defined here narrower than customary in the art of polymerization that typically considers the catalyst system as part of the polymerization system. In the current definition, the mixture present in the polymerization reactor and in its effluent is composed of the polymerization system plus the catalyst system.

To be in the supercritical state, a substance must have a temperature above its critical temperature (Tc) and a pressure above its critical pressure (Pc). If not measured, critical temperatures (Tc) and critical pressures (Pc) are those found in the Handbook of Chemistry and Physics, David R. Lide, Editor-in-Chief, 82nd edition 2001-2002, CRC Press, LLC. New York, 2001. In particular, the Tc and Pc of propylene are 364.9 K and 4.6 MPa. In the event a Tc and/or Pc cannot be measured for a given system, then the Tc and/or Pc will be deemed to be the Tc and/or Pc of the mole fraction weighted averages of the corresponding Tc's and Pc's of the system components.

The following abbreviations are used: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, TMS is trimethylsilyl, TIBA is trisobutylaluminum, MAO is methylaluminoxane, pMe is para-methyl, flu is fluorenyl, cp is cyclopentadienyl, Ind is indenyl.

The term "continuous" is defined to mean a system that operates without interruption or cessation. For example a continuous process to produce a polymer would be one where the reactants are continually introduced into one or more reactors and polymer product is continually withdrawn.

A slurry polymerization means a polymerization process in which particulate, solid polymer forms in a dense fluid or in a liquid/vapor polymerization medium. The dense fluid polymerization medium can form a single or two fluid phases, such as liquid, or supercritical fluid, or liquid/liquid, or supercritical fluid/supercritical fluid polymerization medium. In a liquid/vapor polymerization medium the polymer resides in the liquid (dense fluid) phase.

A solution polymerization means a polymerization process in which the polymer is dissolved in a liquid polymerization system, such as an inert solvent or monomer(s) or their blends. A solution polymerization is typically performed in a homogeneous liquid polymerization system.

A supercritical polymerization means a polymerization process in which the polymerization system is in a dense (i.e. its density is 300 kg/m$^3$ or higher), supercritical state.

A bulk polymerization means a polymerization process in which a dense fluid polymerization system contains less than 40 wt % of inert solvent or diluent. The product polymer may be dissolved in the dense fluid polymerization system or may form a solid phase. In this terminology, a slurry polymerization, in which solid polymer particulates form in a dense fluid polymerization system containing less than 40 wt % of inert solvent or diluent, is referred to as a bulk slurry polymerization process or bulk heterogeneous polymerization process. A polymerization process in which the polymeric product is dissolved in a dense fluid polymerization system containing less than 40 wt % of inert solvent or diluent is referred to as bulk homogeneous polymerization process. A polymerization process in which the polymeric product is dissolved in a liquid polymerization system containing less than 40 wt % of inert solvent or diluent is referred to as bulk solution polymerization process. A polymerization process in which the polymeric product is dissolved in a supercritical polymerization system containing less than 40 wt % of inert solvent or diluent is referred to as bulk homogeneous supercritical polymerization process.

In a homogeneous polymerization system, the polymer product is uniformly dissolved in the polymerization medium. Such systems are not turbid as described in J. Vladimir Oliveira, C. Dariva and J. C. Pinto, Ind. Eng. Chem. Res. 29, 2000, 4627. For purposes of this invention and the claims thereto, turbidity is measured by shining a helium-neon laser through the selected polymerization system in a cloud point cell onto a photocell and determining the point of the onset of rapid increase in light scattering for a given polymerization system. Uniform dissolution in the polymerization medium is indicated when there is little or no light scattering (i.e. less than 5%)

The term "high boiling point diluent" refers to a hydrocarbon having a boiling point of 30° C. or more than the boiling point of propylene (−47.6° C. at 760 mmHg). Advantageous high boiling point diluents have a boiling point of 50° C. or more, or 70° C. or more, or 100° C. or more, or 120° C. or more, or 150° C. or more than the boiling point of propylene (−47.6° C. at 760 mmHg).

For purposes of this invention and the claims thereto, a nucleating agent is defined as an organic or inorganic substance that, when added to the polypropylene described herein at a concentration in a range of 0.005 to 10 wt %, increases the crystallization temperature by at least 3° C. as determined by differential scanning calorimetry at a cooling rate of 10° C./min.

Unless otherwise noted, all molecular weights units (e.g., Mw, Mn, Mz) are g/mol and all ppm's are wt ppm.

The term solvent refers to a dense fluid having a boiling point of 30° C. or more than the boiling point of propylene at 760 mm Hg (−47.6° C. at 760 mm Hg).

DETAILED DESCRIPTION

In an advantageous embodiment, this invention relates to a propylene homopolymer and process for polymerizing propylene in a homogeneous polymerization system. The propylene homopolymer advantageously has a weight-average molecular weight (Mw) of 35,000 g/mol or more. In one or more embodiment, the Mw can be 50,000 g/mol or more; 100,000 g/mol or more; 150,000 g/mol or more; 200,000 g/mol or more; or 500,000 g/mol or more. The propylene homopolymer advantageously has an Mw ranging from about 35,000 to 1,000,000; alternatively from 50,000 to 1,000,000; alternatively from 75,000 to 750,000; alternatively from 100,000 to 400,000. Weight average molecular weights (Mw) are determined using Gel-Permeation Chromatography (GPC), as described in more detail below.

The propylene homopolymer advantageously has a peak melting point, also referred to as peak melting temperature, or melting peak temperature (Tmp) of 149° C. or more, advantageously 150° C. or more, alternatively 151° C. or more, alternatively 152° C. or more, alternatively 153° C. or more, alternatively 154° C. or more, alternatively 155° C. or more. In one or more embodiments, the peak melting temperature can range from about 150° C. to about 170° C., alternatively from 150° C. to about 165° C., alternatively from 152° C. to about 160° C. Peak melting temperature (Tmp) is determined using Differential Scanning Calorimetry (DSC), as described in more detail below.

The propylene homopolymer described herein advantageously has a crystallization half time (Tc-half), as measured by differential scanning calorimetry (DSC), in the absence of any nucleating agents (e.g. 0 wt %), at 126° C. of 12.0 minutes or less, advantageously 12.0 to 3.9 minutes, advantageously 11.5- to 3.4 minutes, advantageously 11.0 to 2.9 minutes, more advantageously 10.5 to 2.4 minutes.

In the current disclosure, the difference between the melting and crystallization peak temperatures (Tmp−Tcp) as measured by DSC will be also referred to as supercooling range and will be expressed in ° C. In one or more embodiments, the homopolymer described herein has a supercooling range (peak melting temperature minus peak crystallization temperature (Tmp−Tcp)) of less than or equal to (0.907 times Tmp) minus 100.14° C. (or expressed by the formula of Tmp−Tcp<(0.907×Tmp)−100.14° C.), as measured on the homopolymer having 0 wt % nucleating agent, advantageously Tmp−Tcp<(0.907×Tmp)−99.64° C.

In one or more embodiments, the propylene homopolymer advantageously has more than 15 and less than 100 regio defects (defined as the sum of 2,1-erythro and 2,1-threo insertions, and 3,1-isomerizations ) per 10,000 propylene units, alternatively more than 17 and less than 100 regio defects per 10,000 propylene units, alternatively more than 20 or 30 or 40, but less than 95 regio defects, alternatively less than 90 regio defects per 10,000 propylene units. The regio defects are determined using $^{13}C$ NMR spectroscopy as described below.

The propylene homopolymer advantageously has a heat of fusion (ΔHf) of 80 J/g or more, alternatively of 90 J/g or more, alternatively of 100 J/g or more, alternatively of 110 J/g or more, alternatively of 120 J/g or more. Heat of fusion (Hf or ΔHf) is determined by using Differential Scanning Calorimetry (DSC), as described in more detail below.

The disclosed propylene homopolymers have little or extremely low inorganic residues typically originating from the catalyst systems (i.e., from the catalyst precursors, activators, and optional supports) and the optional scavengers, such as, for example, alkyl aluminum compounds, or methyl aluminoxane (MAO), etc. In some embodiments, the polymer product has less than 1 weight % silica, or less than 0.1 weight % silica, or less than 100 wt ppm silica, or less than 10 wt ppm silica. In other embodiments, the polymer product contains less than 100 wt ppm Group-4 transition metal, or less than 10 wt ppm Group-4 metal. In a advantageous embodiment, the disclosed homopolymers have a combined Group-4 transition metal (e.g., Ti, Zr, or Hf) and aluminum content of 100 wt ppm or less, or 50 wt ppm or less, or 10 weight ppm or less. In an advantageous embodiment, polymer has an inorganic catalyst residue of 100 weight ppm or less, the inorganic catalyst residue comprising Group 4, Group 6, and Group 8 transition metals, boron, aluminum, and silicon.

The disclosed propylene homopolymers advantageously have narrow molecular weight distribution (MWD) expressed as the ratio of the number and weight average molecular weights (Mw/Mn, measured by GPC with DRI detector) of greater than 1 to less than 5, advantageously 1.2 to 5, or 1.5 to 4, or 1.8 to 3.5 or 1.8 to 3, or 1.8 to 2.5. In a advantageous embodiment the Mw/Mn is greater than 1 and less than or equal to 5. The disclosed propylene homopolymers advantageously have a melt flow rate (MFR, ASTM D1238 at 230° C./2.16 kg) of about 15,000 g/10 min or less, alternatively from 0.1 to 15,000, alternatively from 1 to 10,000, alternatively from 1 to 5,000, alternatively from 10 to 200 g/10 min.

The disclosed propylene homopolymers advantageously have a branching index (g') measured as described below of between 0.85 and 1.10, alternatively from 0.90 to 1.05, alternatively from 0.95 to 1.05.

Polymerization Process

In one or more embodiments, the process to produce polypropylene described herein includes contacting propylene, in a polymerization system, with one or more catalyst systems, at a temperature ranging from 80 to 150° C. and at a pressure ranging from 6.9 to 34.5 MPa. The polymerization advantageously takes place in a homogeneous polymerization system within a continuous polymerization reactor. In one or more embodiments, 15 to less than 35 wt % propylene monomer and from 85 wt % to more than 65 wt % solvent, based on total weight of propylene monomer and optional inert solvent and inert diluent, is fed into a polymerization reactor. Advantageously, about 30 wt % or less propylene monomer, based on total weight of the polymerization system, is present in the reactor effluent at steady state conditions. In one or more embodiments above or elsewhere herein, the monomer feed to the process can include one or more diluents. Scavengers and co-catalysts can also be included in the reactor feed.

In one or more embodiments, the monomer feed can contain 18 wt %, 20 wt %, 22 wt %, 25 wt %, 27 wt %, 30, or 34 wt % propylene, based on total weight of propylene and optional inert solvents and/or inert diluents entering the reactor. In one or more embodiments, the monomer feed can contain monomer ranging from about 20 wt % to about 35 wt %, based on total weight of propylene and optional inert solvents and/or inert diluents entering the reactor. In one or more embodiments, the monomer feed can contain monomer ranging from about 25 wt % to about 35 wt %, based on total weight of monomer and optional inert diluents entering the reactor.

In one or more embodiments, the polymerization system contains from 85 wt % to more than 65 wt % inert solvent. In one or more embodiments, the polymerization system contains greater than 70 wt % and less than 80 wt % inert solvent. In one or more embodiments, the polymerization system contains of from 70 wt % to 50 wt % inert solvent. In one or more embodiments, the inert solvent content of the polymerization system can range from a low of about 67 wt %, 70 wt %, or 73 wt % to an upper limit of 70 wt %, 75 wt %, or 77 wt %, 80 wt %, or 83 wt %. The inert solvent typically comprises hydrocarbons containing from 4 to 100 carbon atoms, advantageously from 4 to 8 carbon atoms. In certain embodiments, the inert solvent is or includes hexane isomers.

In one or more embodiments, the density of the polymerization system is about 0.3 g/mL or more, or about 0.4 g/mL or more, or about 0.5 g/mL or more, or about 0.6 g/mL or more.

In one or more embodiments, the steady state polymer yield (i.e. conversion of propylene monomer to polymer product in a single pass through the reactor) is at least 5 wt % of the propylene monomer fed to the reactor. In one or more embodiments, the conversion of propylene monomer to polymer product in a single pass through the reactor is at least 10%. In one or more embodiments, the conversion of propylene monomer to polymer product in a single pass through the reactor is at least 20%, or at least 30%, or at least 40% but less than 90%, or less than 80%, or less than 70% in a single pass through the reactor.

In one or more embodiments, the polymerization conditions are sufficient to maintain the polymerization system in a single, homogeneous fluid state. For example, the minimum reaction temperature and pressure are selected so that the polymer produced, and the polymerization system that solvates it, remain single phase, i.e. above the polymerization system's cloud point and above its solid-fluid phase transition temperature and pressure with that polymer. Also, lower temperatures generally favor higher crystallinity and higher molecular weight, which are often key product attributes to meet. Furthermore, for homogeneous polymerization processes, the lower limits of reaction temperature can also be determined by the solid-fluid phase transition temperature.

Reactors operated below the solid-fluid phase transition temperature of the reaction mixture can lead to operation problems due to fouling. For the production of highly crystalline polypropylenes (melting peak temperatures>150° C.) in homogeneous polymerization processes, the minimum operating temperature is about 80-100° C. The application of certain inert solvents can further reduce the minimum operation temperature of the fouling-free operation regime, although the substantial presence of inert solvents can reduce polymerization rate, product molecular weight, and can depress the melting peak temperature. The upper limit for temperature can be determined by the product properties that are strongly influenced by the reaction temperature. For example, higher molecular weights and/or higher melting temperatures are generally inversely related to the reaction temperature. Increased temperatures can also degrade many known catalytic systems, providing another reason for avoiding excessive polymerization temperatures. Advantageously, the polymerization temperatures for the production of the disclosed polypropylenes are typically between 80° C. and 150° C., or between 90 and 140° C., or between 100° C. and 130° C., or between 110° C. and 120° C.

In the disclosed processes for making highly crystalline polypropylenes with the above-described melting and supercooling properties and defect structure, the reaction pressure are typically no lower than the solid-fluid phase transition pressure of the polymer-containing dense fluid polymerization system at the reactor temperature. In another embodiment, the pressure is no lower than 10 MPa below the cloud point of the fluid reaction medium at the reactor temperature. In another embodiment, the pressure is between 6.9 and 34.5 MPa, or between 8 and 30 MPa, or between 8 and 25 MPa, or between 8 and 20 MPa, or between 8 and 17 MPa, or between 10 and 17 MPa. In another embodiment, the pressure is above 7, 8, or 9 MPa and below 32, 30, 28, 27, 26, 25, 22, 20, 18, or 15 MPa. In another embodiment, the process to produce polypropylene described herein includes contacting propylene, in a polymerization system, with one or more or catalyst systems, a solvent, and optionally diluent, at a temperature above 80° C. (advantageously above 95° C., or above 100° C., advantageously between 95 and 150° C.) and at a pressure above 6.9 MPa (advantageously above 8 MPa, advantageously between 8 MPa and 30 MPa).

Catalyst System

Polymerization catalysts capable of producing the desired polypropylene under the relatively mild conditions and reduced monomer concentrations described herein typically comprise a catalyst precursor, an activator, and optional support. Useful catalyst precursors for the disclosed polymerization processes include metallocene catalysts represented by the formula:

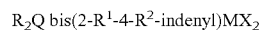

wherein each R is, independently, hydrogen or a $C_1$ to $C_{20}$ hydrocarbyl group, Q is Si, C, CH—CH, or C—$CH_2$, $R^1$ is a $C_1$ to $C_{12}$ linear, branched or cyclic alkyl group, each $R^2$ is, independently, a naphthyl, substituted phenyl or substituted naphthyl group, M is Hf or Zr and X is a halide or a $C_1$ to $C_{20}$ hydrocarbyl group.

Useful metallocene precursor compounds also include $Me_2Si$-bis(2-R,4-Ph-indenyl)$MX_2$, where R is an alkyl group (such as methyl, ethyl, isopropyl, etc.), Ph is phenyl, or naphthyl, or N-carbazyl, or their substituted analogs, M is Hf or Zr, and X is a halogen or alkyl group (such as Cl or methyl), dimethylsilyl-bis(2-methyl,4-phenylindenyl)zirconium dimethyl (or dichloride), dimethylsilyl-bis(2-methyl,4-(3',5'-di-t-butyl-phenyl)indenyl)zirconium dimethyl (or dichloride), dimethylsilyl-bis(2-methyl,4-naphthylindenyl)zirconium dimethyl (or dichloride), dimethylsilyl-bis(2-methyl,4-(N-carbazyl)indenyl)zirconium dimethyl (or dichloride), dimethylsilyl-bis(2-methyl,4-phenylindenyl)hafnium dimethyl (or dichloride), dimethylsilyl-bis(2-methyl,4-(3',5'-di-t-butyl-phenyl)indenyl)hafnium dimethyl (or dichloride), dimethylsilyl-bis(2-methyl,4-naphthylindenyl)hafnium dimethyl (or dichloride), and dimethylsilyl-bis(2-methyl,4-(N-carbazyl)indenyl)hafnium dimethyl (or dichloride).

In some embodiments, the catalyst systems used herein comprise an activator (advantageously a non coordinating anion such as, for example, trimethylammoniumtetrakis(pentafluorophenyl)borate, N,N-dimethylaniliniumtetrakis(pentafluorophenyl)borate, triphenylcarboniumtetra(perfluorophenyl)borate, or N,N-dimethylaniliniumtetra(perfluorophenyl)borate and the like.

Further useful catalyst precursor compounds are represented by the formula:

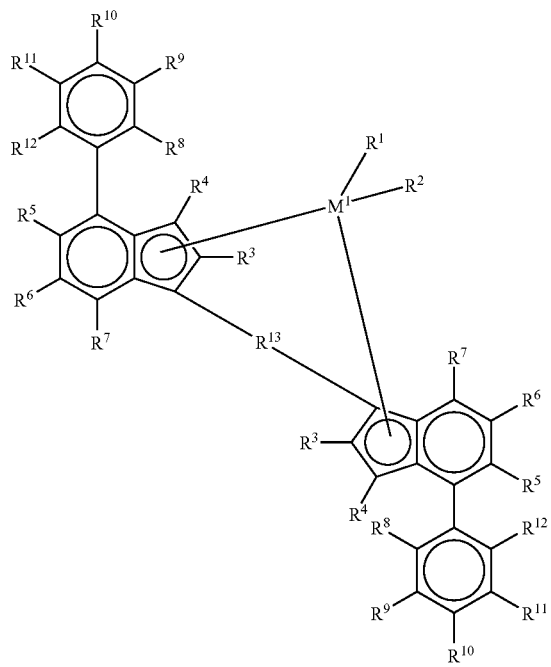

where $M^1$ is selected from zirconium or hafnium; $R^1$ and $R^2$ are individually selected from H, Cl, F, Br, I; $R^3$-$R^{12}$ are individually selected from H, substituted or unsubstituted, linear or branched hydrocarbyl groups having from 1-20 carbon atoms; and $R^{13}$ is a suitable bridging group such as for example $Me_2Si$, or $Ph_2Si$, or $(R-Ph)_2Si$, or $Me_2C$, or $Ph_2C$, or $(R-Ph)_2C$, where R is a linear or branched hydrocarbyl or hydrosilyl group having from 1-20 carbon atoms substituting the phenyl ring advantageously in the para position.

The catalysts can be activated by any activator affording the desired high catalytic activity. Exemplary, but non-limiting activators include aluminoxanes, such as methylaluminoxane (MAO), and ionizing activators such as non-coordinating anions, such as borates, etc. Useful non-coordinating anions include trimethylammoniumtetrakis(pentafluorophenyl)borate, N,N-dimethylaniliniumtetrakis(pentafluorophenyl)borate, triphenylcarbeniumtetrakis(perfluorophenyl)borate, and N,N-dimethylanilinium tetra(perfluorophenyl) borate, and the like. Useful aluminoxanes can be obtained from commercial sources, for example, Akzo-Nobel Corporation, and include methylaluminoxane, MMAO-3A, MMAO-12, and PMAO-IP. Combinations of aluminoxanes, combinations of non-coordinating anion activators, and combinations of aluminoxanes and non-coordinating anion activators can be used in the practice of this invention. Useful metallocene and non-metallocene catalyst compounds disclosed in U.S. Ser. No. 10/667,585, U.S. Pat. No. 7,354,979, and US 2006-0293474 which are herein incorporated by reference. Further advantageous catalyst and activator compounds and combinations thereof useful herein are listed at pages 21 to page 85 of WO 2004/026921 and at page 29, paragraph [0101] to page 66, line 4 of WO 2004/026921. Advantageous activator compounds useful herein include those listed at paragraph [00135] pages 77-78 of WO 2004/026921. Another group of catalyst compounds and activators (e.g. catalyst systems comprising one or more activators and one or more non-metallocene metal-centered, heteroaryl ligand catalyst compounds, where the metal is chosen from the Group 4, 5, 6, the lanthanide series, or the actinide series of the Periodic Table of the Elements) useful herein are disclosed in Ser. No. 11/714,546, filed Mar. 6, 2007, abandoned. Such catalyst compounds are also described in more detail in WO03/040095, WO 03/040201; WO 03/040202; WO 03/040233; WO 03/040442; and U.S. Pat. No. 7,087,690.

The molar ratio of catalyst precursor/activator employed advantageously ranges from 1:10,000 to 100:1, or from 1:5000 to 10:1, more advantageously from 1:100 to 1:1, or 1:10 to 1:1, or 1:5 to 1:1, or 1:2 to 1:1. In some embodiments, the activator can be used in combination with a tri(hydrocarbyl)aluminum or trialkylaluminum compounds having from 1 to 10 carbons in each hydrocarbyl or alkyl group. Mixtures of these tri(hydrocarbyl)aluminum or trialkylaluminum compounds may also be employed. In some embodiments, it is advantageous to employ these aluminum compounds for their beneficial ability to scavenge impurities such as oxygen, water, alcohols, and aldehydes from the polymerization mixture. Further advantageous aluminum compounds include trialkylaluminum compounds having from 1 to 6 carbons in each alkyl group, especially those wherein the alkyl groups are methyl, ethyl, propyl, isopropyl, n-butyl, isobutyl, pentyl, neopentyl or isopentyl. The molar ratio of the catalytic metal complex to scavenger aluminum compound is advantageously from 1:10,000 to 1:100, or from 1:1000 to 1:100, or from 1:100 to 1:1, or from 1:10 to 1:1.

Scavengers

Scavengers can be optionally used. A scavenger can be any compound or combination of compounds that destroy an impurity without destroying the catalyst. Impurities can harm catalysts by reducing their activity. Illustrative scavengers include, but are not limited to, alkyl aluminum compounds, such as trimethylaluminum, triethylaluminum, tri-isobutylaluminum, and trioctylaluminum. The scavenger can also be the same as the catalyst activator and would be applied in excess of what is needed to fully activate the catalyst. These scavengers can include, but are not limited to, aluminoxanes, such as methylaluminoxane (MAO). The scavenger can be introduced to the reactor with the monomer feed or with any other feed stream. In one particular embodiment, the scavenger is introduced with the monomer-containing feed. The scavenger can be homogeneously dissolved in the polymerization system or can form a separate solid phase. In one particular embodiment, scavengers are dissolved in the polymerization system.

Solvents/Diluents

Solvents are typically hydrocarbon liquids that are intentionally fed to the polymerization reactor to aid the dissolution of the polymeric product. Solvents useful herein typically having a boiling point of 50° C. or more, or 70° C. or more, 100° C. or more, 120° C. or more, or 150° C. or more than the boiling point of propylene at 760 mm Hg (−47.6° C. at 760 mm Hg). Inert diluents, such as propane, ethane, butanes, etc., may also be introduced as impurities present in the monomer feed. In continuous reactor operations with monomer recycle, these inert diluents can build up, thus need to be purged from the system. While both the inert solvents and the inert diluents can aid the dissolution of the polymeric product, they are introduced differently and their effectiveness in the dissolution process is different. The presence of inert diluents typically is undesired since they dilute the system reducing reaction rates, and their purging leads to monomer losses and thus increase the cost of production. They are also typically less effective than solvents in aiding the dissolution of the product polypropylene. Therefore, the concentration of inert diluents is advantageously minimized in the feed and in the polymerization system. Inert solvents, on the other hand, are added to the polymerization system to aid the dissolution of the polymeric product and to absorb reaction heat. Advantageous inert solvents for the disclosed processes for making highly crystalline polypropylenes in a homogeneous polymerization dense fluid polymerization system include high-boiling hydrocarbons that include one or more of $C_4$-$C_{100}$ hydrocarbons. Particularly advantageous inert solvents include $C_4$-$C_{20}$, or $C_4$-$C_{12}$, or $C_4$-$C_8$ hydrocarbons. Illustrative advantageous inert solvents include, but are not limited to, n-butane, isobutane, n-pentane, isopentane, n-hexane, mixed hexanes, heptanes, octanes, cyclopentane, cyclohexane, etc., single-ring aromatics, such as toluene and xylenes. In some embodiments, the inert solvent comprises hexanes. Advantageously, the diluent is recyclable. Advantageous solvents are soluble in the polymerization system, and inert to the monomer, the catalyst system, and any other components present in the reactor at the polymerization temperatures and pressures used.

Reactors

One or more reactors in series or in parallel can be used. The catalyst system can be delivered as a solution or slurry, either separately to the reactor, activated in-line just prior to the reactor, or preactivated and pumped as an activated solution or slurry to the reactor. Since heterogeneous (solid) catalysts are often difficult to handle in disclosed homogeneous polymerization processes (they tend to cause plugging and increased wear), advantageous catalyst systems are soluble in the polymerization system. In one embodiment, two solutions, one comprising the one or more catalyst precursor compounds and another comprising the one or more activators, are blended in-line either in or prior to feeding them to the reactor. In other embodiments, the one or more catalyst precursor compounds are premixed with the one or more activators in solution, and a solution of the already activated catalyst is fed to the reactor.

Polymerizations can be carried out either in a single reactor, or in two or more reactors configured in series or parallel. In any operation mode, the catalyst system may comprise one, or more than one catalyst precursor and one or more activator. In both single- and multi-reactor operations, the one or more catalyst systems may be introduced at one point or at multiple points to the one or more polymerization reactors. Various feed configurations can be used depending on such factors as the desired product properties, such as, for example, molecular weight distribution, or catalyst stability. Such feed configurations are well known in the art of chemical engineering and can be readily optimized for the desired production scale and product properties using known engineering techniques.

In one or more embodiments, polymerization can occur in high-pressure reactors where, advantageously, the reactor is substantially unreactive with the polymerization reaction components and is able to withstand the high pressures and temperatures that occur during the polymerization reaction. Such reactors are known as high-pressure reactors for purposes of this disclosure. Withstanding these high pressures and temperatures will allow the reactor to maintain the polymerization system in its homogeneous condition.

Autoclave reactors may be operated in either a batch or continuous mode, although the continuous mode is typically advantageous. Tubular reactors always operate in continuous mode. Typically, autoclave reactors have length-to-diameter ratios of 1:1 to 20:1 and are fitted with a high-speed (up to 2000 RPM) multiblade stirrer and baffles arranged for optimal mixing. Commercial autoclave pressures are typically greater than 5 MPa with a maximum of typically less than 260 MPa. The maximum pressure of commercial autoclaves, however, may become higher with advances in mechanical and material science technologies.

When the autoclave has a low length-to-diameter ratio (such as less than four), the feed streams may be injected at one position along the length of the reactor. Reactors with large diameters may have multiple injection ports at nearly the same or different positions along the length of the reactor. When they are positioned at the same length of the reactor, the injection ports are radially distributed to allow for faster intermixing of the feed components with the reactor content. In the case of stirred tank reactors, the separate introduction of the catalyst and monomer may be advantageous in preventing the possible formation of hot spots in the unstirred feed zone between the mixing point and the stirred zone of the reactor. Injections at two or more positions along the length of the reactor are also possible and may be advantageous. In one exemplary embodiment, in reactors where the length-to-diameter ratio is from 4 to 20, the reactor may contain up to six different injection positions along the reactor length with multiple ports at some or each of the lengths.

Additionally, in the larger autoclaves, one or more lateral mixing devices may support the high-speed stirrer. These mixing devices can also divide the autoclave into two or more zones. Mixing blades on the stirrer may differ from zone to zone to allow for a different degree of plug flow and back mixing, largely independently, in the separate zones. Two or more autoclaves with one or more zones may connect in a series reactor cascade to increase residence time or to tailor polymer structure in a reactor train producing a polymer blending component. A series reactor cascade or configuration consists of two or more reactors connected in series, in which the effluent of at least one upstream reactor is fed to the next reactor downstream in the cascade. Besides the effluent of the upstream reactor(s), the feed of any reactor in the series reactor cascade of a reactor train can be augmented with any combination of additional monomer, catalyst, or solvent fresh or recycled feed streams.

While tubular reactors may generally be considered more suitable for higher pressures, they may also be used in the processes disclosed herein. Tubular reactors are fitted with external cooling and one or more injection points along the (tubular) reaction zone. As in autoclaves, these injection points serve as entry points for monomers (such as propylene), one or more comonomer, catalyst, or mixtures of these. In tubular reactors, external cooling often allows for increased monomer conversion relative to an autoclave, where the low surface-to-volume ratio hinders any significant heat removal. Tubular reactors have a special outlet valve that can send a pressure shockwave backward along the tube. The shockwave helps dislodge any polymer residue that has formed on reactor walls during operation. Alternatively, tubular reactors may be fabricated with smooth, unpolished internal surfaces to address wall deposits. Tubular reactors generally may have lengths of 100-2000 meters or 100-4000 meters, and may have internal diameters of less than 12.5 cm. Typically, tubular reactors have length-to-diameter ratios of 10:1 to 50,000:1 and include up to 10 different injection positions along its length.

Reactor trains that pair autoclaves with tubular reactors are also contemplated within the scope of the polymerization processes disclosed herein for making highly crystalline polypropylenes. In this reactor system, the autoclave typically precedes the tubular reactor or the two types of reactors form separate trains of a parallel reactor configuration. Such reactor systems may have injection of additional catalyst and/or feed components at several points in the autoclave, and more particularly along the tube length. In both autoclaves and tubular reactors, at injection, feeds are typically cooled to near ambient temperature or below to provide maximum cooling and thus maximum polymer production within the limits of maximum operating temperature. In autoclave operation, a preheater may operate at startup, but not after the reaction reaches steady state if the first mixing zone has some back-mixing characteristics. In tubular reactors, the first section of double-jacketed tubing may be heated (especially at start ups) rather than cooled and may operate continuously. A well-designed tubular reactor is characterized by plug flow wherein plug flow refers to a flow pattern with minimal radial flow rate differences. In both multizone autoclaves and tubular reactors, catalyst can not only be injected at the inlet, but also optionally at one or more points along the reactor. The catalyst feeds injected at the inlet and other injection points can be the same or different in terms of content, density, and concentration. Catalyst feed selection allows polymer design tailoring within a given reactor or reactor train and/or maintaining the desired productivity profile along the reactor length.

In addition to autoclave reactors, tubular reactors, or a combination of these reactors, loop-type reactors may be utilized in the polymerization processes disclosed herein. In this reactor type, monomer enters and polymer exits continuously at different points along the loop, while an in-line pump continuously circulates the contents (reaction liquid). The feed/product takeoff rates control the total average residence time. A cooling jacket removes reaction heat from the loop. Typically feed inlet temperatures are near to or below ambient temperatures to provide cooling to the exothermic reaction in the reactor operating above the crystallization temperature of the polymer product. The loop reactor may have a diameter of 41 to 61 cm and a length of 100 to 200 meters and may operate at pressures of 25 to 30 MPa. In addition, an in-line pump may continuously circulate the polymerization system through the loop reactor.

The polymerization processes disclosed herein may have residence times in the reactors as short as 0.5 seconds and as long as several hours, alternatively from 1 sec to 120 min, alternatively from 1 second to 60 minutes, alternatively from 5 seconds to 30 minutes, alternatively from 30 seconds to 30 minutes, alternatively from 1 minute to 60 minutes, and alternatively from 1 minute to 30 minutes. More particularly, the residence time may be selected from 10, or 30, or 45, or 50, seconds, or 1, or 5, or 10, or 15, or 20, or 25, or 30 or 60 or 120 minutes. Maximum residence times may be selected from 1, or 5, or 10, or 15, or 30, or 45, or 60, or 120 minutes.

The monomer-to-polymer conversion rate (also referred to as the conversion rate) is calculated by dividing the total quantity of polymer that is collected during the reaction time by the amount of monomer added to the reaction. Lower conversions may be advantageous to limit viscosity although increase the cost of monomer recycle. The optimum total monomer conversion thus will depend on reactor design, product slate, process configuration, etc., and can be determined by standard engineering techniques. Total monomer conversion during a single pass through any individual reactor of the fluid phase in-line process for blending disclosed herein may be up to 90%, or below 80%, or below 60% or 3-80%, or 5-80%, or 10-80%, or 15-80%, or 20-80%, or 25-60%, or 3-60%, or 5-60%, or 10-60%, or 15-60%, or 20-60%, or 10-50%, or 5-40%, or 10-40%, or 40-50%, or 15-40%, or 20-40%, or 30-40% or greater than 5%, or greater than 10%.

Advantageously, catalyst productivities range from 100 to 500,000 kg PP/(kg catalyst hr). This high level of catalyst productivity in combination of using unsupported catalysts, can result in low residual inorganic residues in the polymer product. In some embodiments, the polymer product has less than 1 weight % silica, or less than 0.1 weight % silica, or less than 100 wt ppm silica, or less than 10 wt ppm silica. In other embodiments, the polymer product contains less than less than 100 wt ppm Zr and Hf, or less than 10 wt ppm Zr and Hf. In a advantageous embodiment, the disclosed homopolymers have a combined Zr, Hf, and aluminum content of 100 wt ppm or less, or 50 wt ppm or less, or 10 wt ppm or less.

The invention also relates to one or more of the following embodiments:

1. A continuous process to produce polypropylene comprising contacting propylene in a reactor at 80 to 150° C. and 6.9 to 34.5 MPa, in the presence of an activator and a metallocene represented by the formula:

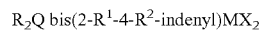

$$R_2Q\ bis(2\text{-}R^1\text{-}4\text{-}R^2\text{-}indenyl)MX_2$$

wherein each R is, independently, hydrogen or a $C_1$ to $C_{20}$ hydrocarbyl group, Q is Si, C, CH—CH, or CH—CH$_2$, $R^1$ is a $C_1$ to $C_{12}$ linear, branched or cyclic alkyl group, each $R^2$ is, independently, a naphthyl, substituted phenyl or substituted naphthyl group, M is Hf or Zr and X is a halide or a $C_1$ to $C_{20}$ hydrocarbyl group, wherein 15 to less than 35 wt % propylene monomer, and 85 wt % to more than 65 wt % solvent, based on total weight of propylene monomer and solvent, is fed into the polymerization reactor, and the polymerization occurs at a temperature above the solid-fluid phase transition temperature of the polymerization system and above a pressure greater than 1 MPa below the cloud point pressure of the polymerization system, provided however that the polymerization occurs: (1) at a temperature below the critical temperature of the polymerization system, or (2) at a pressure below the critical pressure of the polymerization system, recovering an isotactic propylene homopolymer having:
  1) more than 15 and less than 100 regio defects (sum of 2,1-erythro and 2,1-threo insertions and 3,1-isomerizations) per 10,000 propylene units;
  2) an Mw (weight average molecular weight) of 35,000 g/mol or more;
  3) a peak melting temperature of greater than 149° C.;
  4) an mmmm pentad fraction of 0.85 or more;
  5) a heat of fusion of 80 J/g or more; and
  6) a peak melting temperature minus peak crystallization temperature (Tmp–Tcp) of less than or equal to (0.907 times Tmp) minus 99.64 (Tmp–Tcp≦(0.907×Tmp)–99.64), as measured in ° C. on the homopolymer having 0 wt % nucleating agent.

2. The process according to preceding paragraph wherein the polypropylene has an Mw/Mn ratio of greater than 1 to less than 5.
3. The process according to any of preceding paragraphs wherein the polypropylene has an inorganic catalyst residue of 100 weight ppm or less, the inorganic catalyst residue comprising Zr, Hf, boron, aluminum, and silicon.
4. The process according to any of preceding paragraphs, where the peak melting temperature (Tmp) is from about 149° C. to about 170° C.
5. The process according to any of preceding paragraphs, wherein the polypropylene has a branching index (g') of between 0.85 to 1.10.
6. The process according to any of preceding paragraphs, wherein the peak melting temperature minus peak crystallization temperature (Tmp−Tcp) is less than or equal to (0.907 times Tmp) minus 100.14, (measured in ° C. on the homopolymer having 0 wt % nucleating agent).
7. The process according to any of preceding paragraphs, wherein the peak melting temperature minus peak crystallization temperature (Tmp−Tcp) is less than or equal to (0.907 times Tmp) minus 100.64, (measured in ° C. on the homopolymer having 0 wt % nucleating agent).
8. The process according to any of preceding paragraphs, wherein the polyproplyene has an mmmm pentad fraction of 0.98 or greater.
9. The process according to any of preceding paragraphs wherein the polypropylene has a heat of fusion of 100 J/g or more.
10. The process according to any of preceding paragraphs, wherein the polypropylene has an Mw of 100,000 g/mol or more.
11. The process according to any of preceding paragraphs wherein the polypropylene has an Mw of 300,000 g/mol or more.
12. The process according to any of preceding paragraphs, where the peak melting temperature (Tmp) is from about 152° C. to about 170° C.
13. The process according to any of preceding paragraphs, wherein the polypropylene has more than 17 and less than 95 defects per 10,000 propylene units.
14. The process according to any of preceding paragraphs, wherein the polypropylene has an mmmm pentad fraction of 0.95 or greater.
15. The process according to any of preceding paragraphs, wherein Mw is 200,000 g/mol or greater, the mmmm pentad fraction is 0.98 or greater, the peak melting temperature (Tmp) is 150° C. to 170° C., the heat of fusion is 95 J/g or greater and wherein the metallocene is selected from the group consisting of: dimethylsilyl-bis(2-methyl,4-phenylindenyl)zirconium dimethyl (or dichloride), dimethylsilyl-bis(2-methyl,4-(3',5=-di-t-butyl-phenyl)indenyl)zirconium dimethyl (or dichloride), dimethylsilyl-bis(2-methyl,4-naphthylindenyl)zirconium dimethyl (or dichloride), dimethylsilyl-bis(2-methyl,4-(N-carbazyl)indenyl)zirconium dimethyl (or dichloride), dimethylsilyl-bis(2-methyl,4-phenylindenyl)hafnium dimethyl (or dichloride), dimethylsilyl-bis(2-methyl,4-(3',5'-di-t-butyl-phenyl)indenyl)hafnium dimethyl (or dichloride), dimethylsilyl-bis(2-methyl,4-naphthylindenyl)hafnium dimethyl (or dichloride), and dimethylsilyl-bis(2-methyl,4-(N-carbazyl)indenyl)hafnium dimethyl (or dichloride), or mixtures thereof, and the activator is selected from the group consisting of aluminoxane, trimethylammoniumtetrakis(pentafluorophenyl)borate, N,N-dimethylaniliniumtetrakis(pentafluorophenyl)borate, triphenylcarbeniumtetrakis(perfluorophenyl)borate, N,N-dimethylaniliniumtetrakis(perfluoronaphthyl)borate, N,N-dimethylaniliniumtetrakis(perfluorophenyl)-borate, and mixtures thereof.
16. The process according to any of preceding paragraphs, wherein the residence time is from about 3 minutes to about 30 minutes.
17. The process according to any of preceding paragraphs wherein the reactor operates at 93 to 150° C. and 6.9 to 34.5 MPa, where the temperature is above the cloud point temperature and above the supercritical temperature of the polymerization system, and in the presence of an activator and a metallocene represented by the formula:

$R_2Q \, bis(2\text{-}R^1\text{-}4\text{-}R^2\text{-indenyl})MX_2$ wherein each R is, independently, hydrogen or a $C_1$ to $C_{20}$ hydrocarbyl group, Q is Si, C, CH—CH, or CH—$CH_2$, $R^1$ is a $C_1$ to $C_{12}$ linear, branched or cyclic alkyl group, $R^2$ is phenyl or naphthyl or a substituted phenyl or naphthyl group, M is Hf or Zr and X is a halide or a $C_1$ to $C_{20}$ hydrocarbyl group.
18. The process according to any of preceding paragraphs, wherein Mw is 200,000 g/mol or greater, the mmmm pentad fraction is 0.98 or greater, the peak melting temperature (Tmp) is 149° C. to 170° C., the heat of fusion is 95 J/g or greater
19. The process according to any of preceding paragraphs, wherein the metallocene is selected from the group consisting of: dimethylsilyl-bis(2-methyl,4-phenylindenyl)zirconium dimethyl (or dichloride), dimethylsilyl-bis(2-methyl,4-(3',5'-di-t-butyl-phenyl)indenyl)zirconium dimethyl (or dichloride), dimethylsilyl-bis(2-methyl,4-naphthylindenyl)zirconium dimethyl (or dichloride), dimethylsilyl-bis(2-methyl,4-(N-carbazyl)indenyl)zirconium dimethyl (or dichloride), dimethylsilyl-bis(2-methyl,4-phenylindenyl)hafnium dimethyl (or dichloride), dimethylsilyl-bis(2-methyl,4-(3',5'-di-t-butyl-phenyl)indenyl)hafnium dimethyl (or dichloride), dimethylsilyl-bis(2-methyl,4-naphthylindenyl)hafnium dimethyl (or dichloride), and dimethylsilyl-bis(2-methyl,4-(N-carbazyl)indenyl)hafnium dimethyl (or dichloride), or mixtures thereof.
20. The process according to any of preceding paragraphs, wherein from about 20 wt % to about 30 wt % propylene monomer and from about 80 wt % to about 70 wt % solvent, based on total weight of propylene monomer and solvent, is fed into the polymerization reactor.
21. The process according to any of preceding paragraphs, wherein the catalyst productivity is about 100,000 g polymer per g of metallocene or more.
22. The process according to any of preceding paragraphs, wherein the residence time is about 3 minutes to about 30 minutes.
23. The process according to any of preceding paragraphs, wherein the activator is selected from the group consisting of aluminoxane, trimethylammoniumtetrakis(pentafluorophenyl)borate, N,N-dimethylaniliniumtetrakis(pentafluorophenyl)borate, triphenylcarbeniumtetrakis(perfluorophenyl)borate, N,N-dimethylaniliniumtetrakis(perfluoronaphthyl)borate, N,N-dimethylaniliniumtetrakis(perfluorophenyl)borate, and mixtures thereof.
24. An article made from polypropylene made according to the process according to any of preceding paragraphs.

EXAMPLES

Propylene Polymerization Conditions:

All polymerizations were performed in solution polymerization systems (i.e., in the presence of substantial amounts of solvent, >35 wt %) and without monomer recycle. All polymerization experiments were performed in a continuous stirred tank reactor (CSTR) made by Autoclave Engineers, Erie Pa. The reactor was designed for operating at a maximum pressure and temperature of 207 MPa (30 kpsi) and 225° C., respectively. The nominal reactor volume was 150 mL with a working volume of 127 mL (working volume lower due to reactor internals). The reactor was equipped with an electric heater and with a stirrer with a magnetic drive. A pressure transducer located on the monomer feed line measured the pressure in the reactor. The temperature was measured inside the reactor using a type-K thermocouple. The reactor was protected against over-pressurization by automatically opening an air-actuated valve (High Pressure Company, Erie, Pa.) in case the reactor pressure exceeded the preset limit. A flush-mounted rupture disk located on the side of the reactor provided further protection against catastrophic pressure failure. All product lines were heated to ~150° C. to prevent fouling. The reactor body had two heating bands that were controlled by a programmable logic control device (PLC). The reactor did not have cooling capability. Once the reactor lined out during polymerization, its temperature was controlled manually by adjusting the flow rates of the monomer and catalyst feeds. No external heating was necessary in most experiments, i.e. the reactor temperature was maintained by controlling the heat released by the polymerization process.

Two independent lock-hopper assemblies were used to manage the effluent flow from the reactor: one for waste collection during start up and shut down, and the other one for product collection during the balance period at lined-out, steady-state conditions. Each lock-hopper consisted of two air-actuated valves bracketing a short piece of high-pressure tubing. Changing the internal diameter and/or the length of the lock-hopper tube allowed the adjustment of the volume of the lock-hoppers. Aliquots of the reactor content were taken out continuously by running the lock-hopper valves in cycles. One lock-hopper cycle consisted of first opening and closing of the valve between the lock-hopper tube and the reactor followed by opening and closing the downstream valve. Adjustments in the frequency of the lock-hopper cycles allowed maintaining the desired reactor pressure at a preset feed rate. The volume and the frequency of the two lock-hoppers were always set the same to allow switching between the lock-hoppers without affecting the steady state condition of the reactor. A drain port on the bottom of the reactor was used to empty the reactor after each experiment.

Propylene was fed from low-pressure cylinders equipped with a dip leg for liquid delivery to the reactor. Heating blankets provided heat to increase the cylinder head pressure to deliver the monomer to the feed pump at a pressure above the bubble point of the feed. The low-pressure monomer feed was also stabilized against bubble formation by cooling the pump head using chilled water running at 10° C. The monomer feed was purified using two separate beds in series: activated copper (reduced in flowing $H_2$ at 225° C. and 1 bar) for oxygen removal and molecular sieve (5A, activated in flowing $N_2$ at 270° C.) for water removal. The purified monomer feed was fed by a diaphragm pump (Model MhS 600/11, ProMinent Orlita, Germany) through the stirrer head into the reactor. The monomer flow rate was measured by a Coriolis mass flow meter (Model PROline Promass 80, Endress and Hauser) that was located downstream of the purification traps on the low-pressure side of the feed pump. The pressure fluctuation in the reactor caused some minor fluctuation in the feed rate. The reported feed flows were determined by averaging the flow rate during the entire balance period.

The catalyst feed solution was prepared inside an argon-filled dry box (Vacuum Atmospheres Co., Hawthorne, Calif.). The atmosphere in the glove box was purified to maintain <1 ppm $O_2$ and <1 ppm water. All glassware was oven-dried for a minimum of 4 hours at 120° C. and transferred hot to the antechamber of the dry box. Stock solutions of the catalyst precursors and the activators were prepared using purified toluene and stored in amber bottles inside the dry box. Aliquots were taken to prepare fresh activated catalyst solutions before each polymerization experiment. The catalyst solution was fed by dual-stage high-pressure syringe pumps (PDC, Inc., Warminster, Pa.). Catalyst concentrations of the catalyst feed were adjusted to maintain the target reaction temperature at feed rates that introduced not more than 3-8 wt % of catalyst solvent (toluene) into the reactor.

In a typical experiment, the reactor was preheated to ~10-15° C. below that of the desired reaction temperature. During the line-out period, the catalyst feed and lock-hopper rates were adjusted to reach and maintain the target reaction temperature and pressure. Once the reactor reached steady state at the desired conditions, product collection was switched from the waste collection to the on-balance product collection vessel. The reactor was typically run on-balance between 30 to 90 min, after which the effluent was redirected to the waste collection vessel and the reactor was shut down. The products were collected from the on-balance vessel. The products were vacuum-dried overnight at 70° C. before characterization. The conversion and reaction rates were determined based on the total feed used and the product yield during the balance period.

Anhydrous toluene from Sigma-Aldrich was used in catalyst preparation and for reactor flushing. Copper and molecular sieve traps were installed in the toluene feed line, the description of which is given earlier for the gas feed (vide supra). Propylene Grade 2.5 (BOC) was obtained in #100 low-pressure cylinders. Tri-isobutylaluminum (Sigma-Aldrich) was used for passivating the feed line and the reactor if they were exposed to air during maintenance. The hexane solvent was purified the same way as toluene. It was spiked with tri-n-octyl aluminum (TONAL) to eliminate the last traces of impurities and was fed to the reactor by a membrane pump (ProMinent Orlita, Germany).

Table 1 lists the catalysts precursor compositions, activators, and reactor conditions. Table 2 depicts the MFR, thermal properties (crystallization and melting data), and molecular weight data (obtained by differential refractive index—DRI detector) for the disclosed polypropylenes made at the conditions described in Table 1. Table 3 summarizes the NMR characterization results. Note that each disclosed product listed in these tables is identified by a unique sample ID in the first column in Table 1. These ID numbers are the same as those listed in Tables 2 and 3. Melting and crystallization data listed were obtained at a cooling rate of 10° C./min using differential scanning calorimetry (DSC). Details of the experimental conditions are described later (vide infra). Heat of fusion of the melting endotherm listed in the column indicated by ΔHf may be converted to % crystallinity as described later (vide infra). The difference between melting peak temperature (Tmp) and crystallization peak temperature (Tcp) is listed in the column indicated as Tmp–Tcp/Peak ΔT. The "Tmp–Tcp/Formula" column lists the values obtained by the formula:

$$Formula = Tcp - 0.093 \times Tmp - 99.64.$$

Note that $0 \leq Tcp-0.093 \times Tmp-99.64$ is the rearranged equivalent of the $Tmp-Tcp \leq 0.907 \times Tmp-99.64$, thus values greater than zero in the "Tmp-Tcp/Formula" column indicate polypropylenes that satisfy the supercooling criterion defined by $Tmp-Tcp \leq 0.907 \times Tmp-99.64$. In essence, when the Formula value for a polypropylene is greater than zero, its supercooling is lower and its crystallization rate is faster than the corresponding properties of prior art polypropylenes.

Molecular weight (Mw, Mn, Mz) listed in these tables are obtained via GPC as described herein.

TABLE 1

Process Conditions for the production of Inventive Polypropylenes

| | Catalyst | | Total solv. | Temp. | Pressure | | $C_3^=$ conv. | $C_3^=$ effluent | | Res. time |
|---|---|---|---|---|---|---|---|---|---|---|
| Run # | Precursor | Activator | wt % | °C. | psig | MPa | % | wt % | mol/L | min |
| S1 | 1 | A | 67 | 99 | 1942 | 13.4 | 55 | 14.7 | 2.5 | 12.7 |
| S2 | 1 | A | 66 | 94 | 1569 | 10.8 | 25 | 25.5 | 3.7 | 9.9 |
| S3 | 1 | A | 66 | 98 | 1870 | 12.9 | 26 | 25.1 | 3.7 | 10.0 |
| S4 | 1 | A | 65 | 102 | 1786 | 12.3 | 45 | 19.1 | 3.0 | 10.9 |
| S5 | 1 | A | 65 | 102 | 1706 | 11.8 | 39 | 21.1 | 3.2 | 11.2 |
| S6 | 1 | B | 67 | 112 | 1650 | 11.4 | 39 | 20.3 | 3.0 | 9.3 |
| S7 | 1 | B | 65 | 111 | 1670 | 11.5 | 37 | 22.3 | 3.3 | 9.4 |
| S8 | 1 | B | 68 | 101 | 1870 | 12.9 | 47 | 16.9 | 2.6 | 11.1 |
| S9 | 1 | B | 67 | 101 | 1742 | 12.0 | 37 | 20.8 | 3.1 | 10.4 |
| S10 | 1 | B | 73 | 114 | 1589 | 11.0 | 50 | 13.6 | 2.1 | 9.1 |
| S11 | 1 | B | 74 | 110 | 1636 | 11.3 | 43 | 15.1 | 2.3 | 8.8 |
| S12 | 1 | B | 74 | 106 | 1617 | 11.2 | 41 | 15.2 | 2.3 | 8.8 |
| S13 | 1 | B | 75 | 100 | 1692 | 11.7 | 43 | 14.5 | 2.2 | 9.6 |
| S14 | 1 | B | 69 | 106 | 1648 | 11.4 | 39 | 18.9 | 2.9 | 9.2 |
| S15 | 1 | B | 74 | 115 | 1692 | 11.7 | 41 | 15.4 | 2.3 | 9.0 |
| S16 | 1 | B | 77 | 106 | 1656 | 11.4 | 50 | 11.3 | 1.7 | 9.4 |
| S17 | 1 | B | 78 | 110 | 1697 | 11.7 | 54 | 11.7 | 1.8 | 9.3 |
| S18 | 1 | B | 75 | 116 | 1697 | 11.7 | 39 | 20.7 | 3.1 | 9.2 |
| S19 | 1 | B | 78 | 100 | 1705 | 11.8 | 54 | 10.3 | 1.6 | 9.9 |
| S20 | 1 | A | 66 | 116 | 1742 | 12.0 | 47 | 18.0 | 2.8 | 10.5 |
| S21 | 2 | A | 68 | 102 | 2423 | 16.7 | 32 | 23.5 | 3.5 | 13.4 |
| S22 | 2 | A | 68 | 108 | 1919 | 13.2 | 32 | 20.6 | 3.2 | 13.7 |
| S23 | 2 | A | 70 | 107 | 1735 | 12.0 | 30 | 20.5 | 3.0 | 12.3 |
| S24 | 2 | B | 69 | 108 | 2041 | 14.1 | 31 | 20.1 | 3.0 | 12.8 |
| S25 | 2 | B | 69 | 114 | 1810 | 12.5 | 31 | 20.5 | 3.0 | 11.0 |
| S26 | 2 | B | 69 | 123 | 1703 | 11.7 | 31 | 21.7 | 3.2 | 10.1 |
| S27 | 2 | B | 65 | 119 | 1765 | 12.2 | 35 | 23.0 | 3.4 | 10.8 |
| S28 | 2 | B | 67 | 119 | 2003 | 13.8 | 33 | 19.5 | 3.0 | 11.9 |

Catalyst precursor:
1 = 3'5'-tBu-Q: dimethyl(μ-dimethylsilyl)bis(2-methyl-4-(3,'5'-di-tert-butylphenyl)indenyl)zirconium;
2 = dimethyl(μ-dimethylsilyl)bis(2-methyl-4-(N-carbazyl)indenyl)zirconium.
Activator:
A = dimethylaniliniumtetrakis(heptafluoronaphthyl)borate,
B = dimethylaniliniumtetrakis(pentafluorophenyl)borate.

TABLE 2

Properties for Inventive Polypropylenes

| | | Crystallization | | Melting ($2^{nd}$) | | Tmp – Tcp | | DRI | | |
|---|---|---|---|---|---|---|---|---|---|---|
| Run # | MFR g/10 min | Tco onset °C. | Tcp peak °C. | Tm peak °C. | ΔHf J/g | Peak ΔT °C. | Formula* °C. | Mw kg/mol | Mw/Mn | Mz/Mw |
| S1 | 69 | 121.0 | 116.8 | 155.4 | 101.6 | 38.6 | 2.7 | 134.2 | 2.00 | 1.66 |
| S2 | 9 | 119.9 | 116.0 | 157.0 | 100.0 | 41.0 | 1.8 | 235.4 | 2.03 | 1.67 |
| S3 | 12 | 117.9 | 114.5 | 155.6 | 100.5 | 41.1 | 0.4 | 214.6 | 2.00 | 1.65 |
| S4 | 62 | 118.3 | 114.7 | 155.4 | 101.0 | 40.7 | 0.6 | 139.7 | 2.03 | 1.65 |
| S5 | 60 | 117.1 | 114.1 | 156.9 | 103.0 | 42.8 | −0.1 | 153.7 | 2.04 | 1.67 |
| S6 | 311 | 122.9 | 119.9 | 157.3 | 104.9 | 37.4 | 5.6 | 111.6 | 2.02 | 1.69 |
| S7 | 181 | 122.6 | 120.2 | 155.9 | 110.7 | 35.7 | 6.1 | 109.7 | 1.99 | 1.61 |
| S8 | 75 | 118.7 | 115.8 | 157.1 | 107.4 | 41.3 | 1.5 | 136.5 | 2.01 | 1.66 |
| S9 | 36 | 121.0 | 117.4 | 157.4 | 106.0 | 40.1 | 3.1 | 165.0 | 1.99 | 1.66 |
| S10 | 710 | 121.3 | 118.4 | 154.4 | 108.7 | 36.0 | 4.4 | 76.5 | 1.99 | 1.57 |
| S11 | 241 | 122.3 | 119.6 | 156.2 | 108.4 | 36.6 | 5.4 | 88.8 | 2.00 | 1.60 |
| S12 | 142 | 120.0 | 116.5 | 156.7 | 109.7 | 40.2 | 2.3 | 117.3 | 2.01 | 1.63 |
| S13 | 70 | 121.4 | 117.7 | 157.4 | 110.1 | 39.7 | 3.4 | 148.2 | 1.99 | 1.65 |
| S14 | 134 | 120.8 | 115.8 | 156.0 | 103.4 | 40.2 | 1.7 | 115.1 | 2.01 | 1.63 |
| S15 | 652 | 120.4 | 116.8 | 154.3 | 113.1 | 37.5 | 2.8 | 75.5 | 2.02 | 1.57 |
| S16 | 249 | 118.2 | 116.2 | 155.2 | 109.4 | 39.0 | 2.1 | 93.6 | 2.05 | 1.63 |
| S17 | 704 | 121.7 | 118.4 | 155.0 | 112.4 | 36.6 | 4.3 | 79.7 | 2.01 | 1.60 |
| S18 | 424 | 120.0 | 116.2 | 155.0 | 109.7 | 38.8 | 2.1 | 82.4 | 2.01 | 1.58 |
| S19 | 119 | 120.6 | 116.6 | 156.4 | 109.9 | 39.8 | 2.4 | 115.5 | 2.03 | 1.65 |

TABLE 2-continued

Properties for Inventive Polypropylenes

| Run # | MFR g/10 min | Crystallization | | Melting (2$^{nd}$) | | Tmp – Tcp | | DRI | | |
|---|---|---|---|---|---|---|---|---|---|---|
| | | Tco onset °C. | Tcp peak °C. | Tm peak °C. | ΔHf J/g | Peak ΔT °C. | Formula* °C. | Mw kg/mol | Mw/Mn | Mz/Mw |
| S20 | 324 | 116.9 | 114.9 | 152.6 | 103.1 | 37.7 | 1.1 | 87.8 | 2.03 | 1.59 |
| S21 | 2 | 119.3 | 116.1 | 157.4 | 100.7 | 41.3 | 1.8 | 400.1 | 2.30 | 1.66 |
| S22 | 7 | 118.6 | 115.8 | 155.9 | 99.3 | 40.1 | 1.7 | 278.6 | 2.48 | 1.74 |
| S23 | 8 | 120.6 | 116.1 | 156.4 | 102.5 | 40.3 | 1.9 | 277.6 | 2.55 | 1.76 |
| S24 | 8 | 121.7 | 118.2 | 158.1 | 103.2 | 39.9 | 3.8 | 247.6 | 2.48 | 1.77 |
| S25 | 17 | 122.3 | 118.9 | 158.8 | 102.8 | 39.9 | 4.5 | 194.7 | 2.37 | 1.75 |
| S26 | 62 | 118.8 | 115.2 | 154.8 | 102.9 | 39.6 | 1.2 | 140.7 | 2.56 | 1.76 |
| S27 | 51 | 122.1 | 118.9 | 155.9 | 101.3 | 37.0 | 4.8 | 153.0 | 2.45 | 1.76 |
| S28 | 56 | 120.9 | 117.6 | 156.0 | 105.0 | 38.4 | 3.5 | 146.4 | 2.69 | 1.81 |

*Formula = Tcp – 0.093 × Tmp – 99.64

TABLE 3

NMR Results for inventive Polypropylenes

| | Pentads | Defect/10,000 $C_3^-$ | | | |
|---|---|---|---|---|---|
| Run # | Mole fraction mmmm | 2.1 erythro | 2.1 threo | 3.1 insertion | Total regio |
| S1 | .988 | 31 | 0 | 11 | 41 |
| S2 | .990 | 33 | 0 | 6 | 39 |
| S3 | .991 | 33 | 0 | 7 | 39 |
| S4 | .989 | 32 | 0 | 11 | 43 |
| S5 | .990 | 33 | 0 | 8 | 41 |
| S6 | .983 | 29 | 0 | 11 | 40 |
| S7 | .984 | 29 | 0 | 10 | 38 |
| S8 | .989 | 27 | 0 | 7 | 34 |
| S9 | .992 | 26 | 0 | 7 | 33 |
| S10 | .983 | 25 | 0 | 13 | 38 |
| S11 | .983 | 25 | 0 | 12 | 38 |
| S12 | .984 | 27 | 0 | 10 | 37 |
| S13 | .990 | 26 | 0 | 8 | 33 |
| S14 | .986 | 27 | 0 | 9 | 36 |
| S15 | .981 | 25 | 0 | 14 | 38 |
| S16 | .986 | 24 | 0 | 10 | 34 |
| S17 | .984 | 23 | 0 | 13 | 36 |
| S18 | .984 | 26 | 0 | 13 | 39 |
| S19 | .987 | 23 | 0 | 9 | 32 |
| S20 | .983 | 32 | 0 | 17 | 49 |
| S21 | .991 | 29 | 0 | 11 | 40 |
| S22 | .987 | 30 | 0 | 18 | 48 |
| S23 | .987 | 25 | 0 | 14 | 39 |
| S24 | .986 | 22 | 0 | 13 | 35 |
| S25 | .985 | 21 | 0 | 16 | 37 |
| S26 | .988 | 19 | 0 | 20 | 39 |
| S27 | .984 | 20 | 0 | 18 | 38 |
| S28 | .982 | 20 | 0 | 21 | 42 |

Regio Defect Concentrations by $^{13}$C NMR

Carbon NMR spectroscopy was used to measure stereo and regio defect concentrations in the polypropylene. Carbon NMR spectra were acquired with a 10-mm broadband probe on a Varian UnityPlus 500 spectrometer. The samples were prepared in 1,1,2,2-tetrachloroethane-d2 (TCE). Sample preparation (polymer dissolution) was performed at 140° C. In order to optimize chemical shift resolution, the samples were prepared without chromium acetylacetonate relaxation agent. Signal-to-noise was enhanced by acquiring the spectra with nuclear Overhauser enhancement for 6 seconds before the acquisition pulse. The 3.2 second acquisition period was followed by an additional delay of 5 seconds, for an aggregate pulse repetition delay of 14 seconds. Free induction decays of 3400-4400 coadded transients were acquired at a temperature of 120° C. After Fourier transformation (256 K points and 0.3 Hz exponential line broadening), the spectrum is referenced by setting the dominant mmmm meso methyl resonance to 21.83 ppm.

Chemical shift assignments for the stereo defects (given as stereo pentads) can be found in the literature [L. Resconi, L. Cavallo, A. Fait, and F. Piemontesi, Chem. Rev. 2000, 100, pages 1253-1345]. The stereo pentads (e.g. mmmm, mmmr, mrrm, etc.) can be summed appropriately to give a stereo triad distribution (mm, mr, and rr), and the mole percentage of stereo diads (m and r). Three types of regio defects were quantified: 2,1-erythro, 2,1-threo, and 3,1-isomerization. The structures and peak assignments for these are also given in the reference by Resconi. The concentrations for all defects are quoted in terms of defects per 10,000 monomer units.

The regio defects each give rise to multiple peaks in the carbon NMR spectrum, and these are all integrated and averaged (to the extent that they are resolved from other peaks in the spectrum), to improve the measurement accuracy. The chemical shift offsets of the resolvable resonances used in the analysis are tabulated below. The precise peak positions may shift as a function of NMR solvent choice.

| Regio defect | Chemical shift range (ppm) |
|---|---|
| 2,1-erythro | 42.3, 38.6, 36.0, 35.9, 31.5, 30.6, 17.6, 17.2 |
| 2,1-threo | 43.4, 38.9, 35.6, 34.7, 32.5, 31.2, 15.4, 15.0 |
| 3,1 insertion | 37.6, 30.9, 27.7 |

The average integral for each defect is divided by the integral for one of the main propylene signals (CH3, CH, CH2), and multiplied by 10000 to determine the defect concentration per 10000 monomers.

Differential Scanning Calorimetry for Measuring Crystallization and Melting Temperatures (Tcp and Tmp) and Heat of Fusion (ΔHf):

Peak crystallization temperature (Tcp), peak melting temperature (Tmp) and heat of fusion (Hf, or ΔHf) were measured using Differential Scanning Calorimetry (DSC) on reactor samples (with no nucleating agent added). This analysis was conducted using either a TA Instruments MDSC 2920 or a Q2000 Tzero DSC. The DSC was calibrated for temperature using four standards (tin, indium, cyclohexane, and water). The heat of fusion of indium (28.46 J/g) was used to calibrate the heat flow signal. The reproducibility of peak melting temperatures for polypropylene is within ±0.3° C. and heat of fusion is within 2%. Typically about 3 to 5 mg of polymer from the reactor was sealed in a standard aluminum pan with flat lids and loaded into the instrument at room temperature. The sample was cooled to −70° C. and heated at 10° C./min to 210° C. to acquire the melting data (first heat). This first heating provides the melting behavior for samples made in the reactor. Since thermal history influences melting and crystallization behavior, the sample was held for 5 minutes at 210° C. to destroy its thermal history. This was followed by cooling this sample to −70° C. at a cooling rate of 10° C./min to analyze its crystallization behavior at this cooling rate. The exothermic peak of crystallization was analyzed using the software provided by the vendor and the peak of crystallization (Tcp) is reported. The sample was held at this low temperature of −70° C. for about 10 minutes to equilibrate it and then heated back to 210° C. at 10° C./min to analyze the melting behavior (second heat). This gave the melting behavior of samples crystallized under controlled cooling conditions (10° C./min). The melting temperature reported is obtained by the analysis of the melting peak using the software provided by the vendor and corresponds to the peak of the melting transition (Tmp). All samples reported in this work showed relatively narrow, single melting peaks and the breadth of melting did not show any significant change for different catalysts. Area under the melting curve was used to determine the heat of fusion (ΔHf) in J/g using the software provided by the vendor. This heat of fusion is used to calculate the degree of crystallinity. The percent crystallinity is calculated using the formula: percent crystallinity=[area under the curve (J/g)/207.14 (J/g)]×100%. A value of 207.14 J/g or 8700 J/mol is the equilibrium heat of fusion for 100% crystalline polypropylene and is obtained from Ref: B. Wunderlich in "Thermal Analysis" Academic Press, page 418, 1990.

Melt-Flow Rate Measurements:

The Melt-Flow Rates (MFR) of polymers were determined by using Dynisco Kayeness Polymer Test Systems Series 4003 apparatus following the method described in the Series 4000 Melt Indexer Operation manual, Method B. The method follows ASTM D 1238, Condition L, 2.16 kg and 230° C. All samples were stabilized by using Irganox™ 1010.

Molecular Weights (Mw, Mn and Mz) by Gel-Permeation Chromatography (GPC):

Molecular weight distributions were characterized using Gel-Permeation Chromatography (GPC), also referred to as Size-Exclusion Chromatography (SEC). Molecular weight (weight average molecular weight, Mw, number average molecular weight Mn, viscosity average molecular weight, Mv, and Z average molecular weight, Mz) were determined using High-Temperature Gel-Permeation Chromatography equipped with a differential refractive index detector (DRI) to measure polymer concentrations (either from Waters Corporation with on-line Wyatt DAWN "EOS" and Waters GPCV viscometer detectors, or Polymer Laboratories with on-line Wyatt mini-DAWN and Viscotek Corporation viscometer detectors. Experimental details on the measurement procedure are described in the literature by T. Sun, P. Brant, R. R. Chance, and W. W. Graessley, Macromolecules, Volume 34, Number 19, 6812-6820, (2001).

The analysis was performed using a Waters GPCV 2000 (Gel Permeation Chromatograph) with triple detection. The three detectors were in series with Wyatt DAWN "EOS" MALLS 18 angle laser light scattering detector first, followed by the DRI (Differential Refractive Index) then Differential Viscometer detector. The detector output signals are collected on Wyatt's ASTRA software and analyzed using a GPC analysis program. The detailed GPC conditions are listed in Table 8 below.

Standards and samples were prepared in inhibited TCB (1,2,4-trichlorobenzene) solvent. Four NBS polyethylene standards were used for calibrating the GPC. Standard identifications are listed in the table below. The samples were accurately weighed and diluted to a ~1.5 mg/mL concentration and recorded. The standards and samples were placed on a PL Labs 260 Heater/Shaker at 160° C. for two hours. These were filtered through a 0.45 micron steel filter cup then analyzed.

The concentration, c, at each point in the chromatogram is calculated from the baseline-subtracted DRI signal, IDRI, using the following equation:

$$c = KDRI * IDRI/(dn/dc)$$

where KDRI is a constant determined by calibrating the DRI, and (dn/dc) is the same as described below for the LS analysis. Units on parameters throughout this description of the SEC method are such that concentration is expressed in g/cm$^3$, molecular weight is expressed in g/mole, and intrinsic viscosity is expressed in dL/g.

For the light-scattering detector used at high temperature, the polymer molecular weight, M, at each point in the chromatogram is determined by analyzing the LS output using the Zimm model for static light scattering (M. B. Huglin, Light Scattering from Polymer Solutions, Academic Press, 1971):

$$\frac{K_o c}{\Delta R(\Theta)} = \frac{1}{MP(\Theta)} + 2A_2 c$$

Here, $\Delta R(\theta)$ is the measured excess Rayleigh scattering intensity at scattering angle θ, c is the polymer concentration determined from the DRI analysis, A2 is the second virial coefficient, P(θ) is the form factor for a monodisperse random coil (described in the above reference), and Ko is the optical constant for the system:

$$K_o = \frac{4\pi^2 n^2 (dn/dc)^2}{\lambda^4 N_A}$$

in which NA is Avogadro's number, and (dn/dc) is the refractive index increment for the system. The refractive index, n=1.500 for TCB at 135° C. and λ=690 nm. In addition, A2=0.0006 for propylene polymers and 0.0015 for butene polymers, and (dn/dc) =0.104 for propylene polymers and 0.098 for butene polymers.

A high temperature Viscotek Corporation viscometer was used, which has four capillaries arranged in a Wheatstone bridge configuration with two pressure transducers. One transducer measures the total pressure drop across the detector, and the other, positioned between the two sides of the bridge, measures a differential pressure. The specific viscosity, η$s$, for the solution flowing through the viscometer is calculated from their outputs. The intrinsic viscosity, [η] i, at each point in the chromatogram is calculated from the following equation:

$$[\eta]_i = \eta_{si}/C_i$$

where the concentration, Ci, was determined from the DRI output.

The branching index (g') is calculated using the output of the SEC-DRI-LS-VIS method as follows. The branching index g' is defined as: Sample measured [η]/calculated theoretical [η] of a linear polymer, where the calculated theoretical [η] of a linear=k Mα where k=0.0002288 and α=0.705 for propylene polymers.

Mv is the viscosity average molecular weight based on molecular weights determined by light-scattering (LS) analysis. The viscosity average molecular weight, Mv, of the sample is calculated by:

$$Mv=\{\Sigma hiMi\alpha/\Sigma hi\}1/\alpha$$

Mi=molecular weight for each time slice, hi, from the chromatogram, and the summations are carried out over all chromatographic slices, i.e., between the integration limits.

TABLE 4

| Gel Permeation Chromatography (GPC) measurement conditions | | |
|---|---|---|
| Instrument | | WATERS 2000 V + Wyatt Dawn EOS |
| Column | Type: | 3 x MIXED BED TYPE "B" 10 MICRON PD (high porosity col.'s) |
| | Length: | 300 mm |
| | ID: | 7.8 mm |
| | Supplier | POLYMER LABS |
| Solvent Program | A | 0.54 ml/min TCB inhibited GPC console setting was 0.5 mL/min to which 8% expansion factor (from Waters) makes actual flow 0.54 mL/min |
| Detector | A: | Wyatt MALLS 17 angle's of laser light scattering detector |
| | B: | Differential Refactive Index (DRI) in series |
| | C: | Viscometer IDvol. = +232.2 microliter LS to DRI IDvol. = −91.8 microliter Dp to KRI |
| Temperature | Injector: | 135° C. |
| | Detector: | 135° C. |
| | Column: | 135° C. |
| Dissolution Conditions | | Shaken for 2 h on a PL SP 260 heat Shaker @ 160° C. |
| Sample Filtration | | Through a 0.45μ SS Filter @ 135° C. |
| Injection Volume | | 329.5 μL |
| Sample Concentration | | 0.15 w/v % (1.5 mg/m) Target wt |
| Solvent Diluent | | TCB inhibited |
| Calibration Narrow PE Standards | | NIST 1482a; NIST 1483a; NIST 1484a |
| Broad PE Standard | | NIST 1475a |

All patents, test procedures, and other documents (except U.S. Ser. No. 12/016,346 filed on Jun. 18, 2008 and granted as U.S. Pat. No. 7,812,104) cited in this application are incorporated herein by reference to the extent such disclosure is not inconsistent with this application and for all jurisdictions in which such incorporation is permitted. While the foregoing is directed to embodiments of the present invention, other and further embodiments of the invention can be devised without departing from the basic scope thereof, and the scope thereof is determined by the claims that follow.

What is claimed is:

1. A continuous process to produce polypropylene comprising contacting propylene in a reactor at 80 to 150° C. and 6.9 to 34.5 MPa, in the presence of an activator and a metallocene represented by the formula:

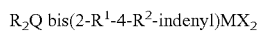

$R_2Q\ bis(2-R^1-4-R^2-indenyl)MX_2$ wherein each R is, independently, hydrogen or a $C_1$ to $C_{20}$ hydrocarbyl group, Q is Si, C, CH—CH, or CH—CH$_2$, $R^1$ is a $C_1$ to $C_{12}$ linear, branched or cyclic alkyl group, each $R^2$ is, independently, a naphthyl, substituted phenyl or substituted naphthyl group, M is Hf or Zr and X is a halide or a $C_1$ to $C_{20}$ hydrocarbyl group, wherein 15 to less than 30 wt % propylene monomer, and 85 wt % to more than 70 wt % solvent, based on total weight of propylene monomer and solvent, is fed into the polymerization reactor, and the polymerization occurs at a temperature above the solid-fluid phase transition temperature of the polymerization system and above a pressure greater than 1 MPa below the cloud point pressure of the polymerization system, provided however that the polymerization occurs: (1) at a temperature below the critical temperature of the polymerization system, or (2) at a pressure below the critical pressure of the polymerization system, recovering an isotactic propylene homopolymer having:
1) more than 15 and less than 100 regio defects (sum of 2,1-erythro and 2,1-threo insertions and 3,1-isomerizations) per 10,000 propylene units;
2) an Mw (weight average molecular weight) of 35,000 g/mol or more;
3) a peak melting temperature of greater than 149° C.;
4) an mmmm pentad fraction of 0.85 or more;
5) a heat of fusion of 80 J/g or more; and
6) a peak melting temperature minus peak crystallization temperature (Tmp−Tcp) of less than or equal to (0.907 times Tmp) minus 99.64 (Tmp−Tcp≦(0.907×Tmp)−99.64), as measured in ° C. on the homopolymer having 0 wt % nucleating agent.

2. The process according to claim 1 wherein the polypropylene has an Mw/Mn ratio of greater than 1 to less than 5.

3. The process according to claim 1 wherein the polypropylene has an inorganic catalyst residue of 100 weight ppm or less, the inorganic catalyst residue comprising Group 4, Group 6, and Group 8 transition metals, boron, aluminum, and silicon.

4. The process according to claim 1, where the peak melting temperature (Tmp) is from greater than 149° C. to about 170° C.

5. The process according to claim 1, wherein the polypropylene has a branching index (g') of between 0.85 to 1.10.

6. The process according to claim 1, wherein the peak melting temperature minus peak crystallization temperature (Tmp−Tcp) is less than or equal to (0.907 times Tmp) minus 100.14, (measured in ° C. on the homopolymer having 0 wt % nucleating agent).

7. The process according to claim 1, wherein the peak melting temperature minus peak crystallization temperature (Tmp−Tcp) is less than or equal to (0.907 times Tmp) minus 100.64, (measured in ° C. on the homopolymer having 0 wt % nucleating agent).

8. The process according to claim 1, wherein the polypropylene has an mmmm pentad fraction of 0.98 or greater.

9. The process according to claim 1 wherein the polypropylene has a heat of fusion of 100 J/g or more.

10. The process according to claim 1, wherein the polypropylene has an Mw of 100,000 g/mol or more.

11. The process according to claim 1 wherein the polypropylene has an Mw of 300,000 g/mol or more.

12. The process according to claim 1, where the peak melting temperature (Tmp) is from about 152° C. to about 170° C.

13. The process according to claim 1, wherein the polypropylene has more than 17 and less than 95 defects per 10,000 propylene units.

14. The process according to claim 1, wherein the polypropylene has an mmmm pentad fraction of 0.95 or greater.

15. The process according to claim 1, wherein Mw is 200,000 g/mol or greater, the mmmm pentad fraction is 0.98 or greater, the peak melting temperature (Tmp) is from greater than 149° C. to 170° C., the heat of fusion is 95 J/g or greater and wherein the metallocene is selected from the group consisting of: dimethylsilyl-bis(2-methyl,4-(3',5'-di-t-butyl-phenyl) indenyl)zirconium dimethyl (or dichloride), dimethylsilyl-bis(2-methyl,4-naphthylindenyl) zirconium dimethyl (or dichloride), dimethylsilyl-bis(2-methyl,4-(3',5'- di-t-butyl-phenyl) indenyl)hafnium dimethyl (or dichloride), dimethylsilyl-bis(2-methyl,4-naphthylindenyl) hafnium dimethyl (or dichloride), or mixtures thereof, and the activator is selected from the group consisting of aluminoxane, trimethylammoniumtetrakis(pentafluorophenyl)borate, N,N-dimethylaniliniumtetrakis (pentafluorophenyl)borate, triphenylcarbeniumtetrakis(perfluorophenyl)borate, N,N-dimethylaniliniumtetrakis (perfluoronaphthyl)borate, N,N-dimethylaniliniumtetrakis (perfluorophenyl)borate, and mixtures thereof.

16. The process according to claim 1, wherein the residence time is about 3 minutes to about 30 minutes.

17. The process according to claim 1 wherein the reactor operates at 93 to 150° C. and 8 to 30 MPa, where the temperature is above the cloud point temperature and above the critical temperature of the polymerization system, and in the presence of an activator and a metallocene represented by the formula:

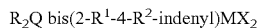

wherein each R is, independently, hydrogen or a $C_1$ to $C_{20}$ hydrocarbyl group, Q is Si, C, CH—CH, or CH—$CH_2$, $R^1$ is a $C_1$ to $C_{12}$ linear, branched or cyclic alkyl group, $R^2$ is naphthyl or a substituted phenyl or a substituted naphthyl group, M is Hf or Zr and X is a halide or a $C_1$ to $C_{20}$ hydrocarbyl group.

18. The process according to claim 17, wherein Mw is 200,000 g/mol or greater, the mmmm pentad fraction is 0.98 or greater, the peak melting temperature (Tmp) is from greater than 149° C. to 170° C., and the heat of fusion is 95 J/g or greater.

19. The process according to claim 17, wherein the metallocene is selected from the group consisting of: dimethylsilyl-bis(2-methyl,4-(3',5'-di-t-butyl-phenyl) indenyl)zirconium dimethyl (or dichloride), dimethylsilyl-bis(2-methyl,4-naphthylindenyl) zirconium dimethyl (or dichloride), dimethylsilyl-bis(2-methyl,4-(3',5'-di-t-butyl-phenyl)indenyl) hafnium dimethyl (or dichloride), dimethylsilyl-bis(2-methyl,4-naphthylindenyl) hafnium dimethyl (or dichloride), or mixtures thereof.

20. The process according to claim 17, wherein about 20 wt % to 30 wt % propylene monomer, and about 80 wt % to 70 wt % solvent, based on total weight of propylene monomer and solvent, is fed into the polymerization reactor.

21. A continuous process to produce polypropylene comprising contacting propylene in a reactor at 80 to 150° C. and 6.9 to 34.5 MPa, in the presence of an activator and a metallocene represented by the formula:

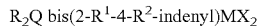

wherein each R is, independently, hydrogen or a $C_1$ to $C_{20}$ hydrocarbyl group, Q is Si, C, CH—CH, or CH—$CH_2$, $R^1$ is a $C_1$ to $C_{12}$ linear, branched or cyclic alkyl group, $R^2$ is phenyl or naphthyl or a substituted naphthyl group, M is Hf or Zr and X is a halide or a $C_1$ to $C_{20}$ hydrocarbyl group; and wherein 15 to less than 30 wt % propylene monomer, and 85 wt % to more than 70 wt % solvent, based on total weight of propylene monomer and solvent, is fed into the polymerization reactor, and the polymerization occurs at a temperature above the solid-fluid phase transition temperature of the polymerization system and above a pressure greater than 1 MPa below the cloud point pressure of the polymerization system, provided however that the polymerization occurs: (1) at a temperature below the critical temperature of the polymerization system or (2) at a pressure below the critical pressure of the polymerization system; wherein the catalyst productivity is about 100,000 g polymer per g of metallocene or more, and recovering an isotactic propylene homopolymer having:
1) more than 15 and less than 100 regio defects (sum of 2,1-erythro and 2,1-threo insertions and 3,1-isomerizations) per 10,000 propylene units;
2) an Mw (weight average molecular weight) of 35,000 g/mol or more;
3) a peak melting temperature of greater than 149° C.;
4) an mmmm pentad fraction of 0.85 or more;
5) a heat of fusion of 80 J/g or more; and
6) a peak melting temperature minus peak crystallization temperature of less than or equal to (0.907 times Tmp) minus 99.64, as measured in ° C. on the homopolymer having 0 wt % nucleating agent.

22. The process according to claim 17, wherein the residence time is about 3 minutes to about 30 minutes.

23. The process according to claim 17, wherein the activator is selected from the group consisting of aluminoxane, trimethylammoniumtetrakis(pentafluorophenyl)borate, N,N-dimethylaniliniumtetrakis (pentafluorophenyl)borate, triphenylcarbeniumtetrakis(perfluorophenyl)borate, N,N-dimethylaniliniumtetrakis (perfluoronaphthyl)borate, N,N-dimethylaniliniumterakis (perfluorophenyl)borate, and mixtures thereof.

24. The process according to claim 21, wherein Mw is 200,000 g/mol or greater, the mmmm pentad fraction is 0.98 or greater, the peak melting temperature (Tmp) is from greater than 149° C. to 170° C., and the heat of fusion is 95 J/g or greater.

25. The process according to claim 21, wherein the metallocene is selected from the group consisting of: dimethylsilyl-bis(2-methyl,4-naphthylindenyl) zirconium dimethyl (or dichloride), dimethylsilyl-bis(2-methyl,4-naphthylindenyl) hafnium dimethyl (or dichloride), or mixtures thereof.

26. The process according to claim 21,wherein about 20 wt % to 30 wt % propylene monomer, and about 80 wt % to 70 wt % solvent, based on total weight of propylene monomer and solvent, is fed into the polymerization reactor.

27. The process according to claim 21, wherein the residence time is about 3 minutes to about 30 minutes.

28. The process according to claim 21, wherein the activator is selected from the group consisting of aluminoxane, trimethylammoniumtetrakis(pentafluorophenyl)borate, N,N-dimethylaniliniumtetrakis (pentafluorophenyl)borate, triphenylcarbeniumtetrakis(perfluorophenyl)borate, N,N-dimethylaniliniumtetrakis (perfluoronaphthyl)borate, N,N-dimethylaniliniumtetrakis (perfluorophenyl)borate, and mixtures thereof.

29. The process according to claim 21, wherein the peak melting temperature minus peak crystallization temperature (Tmp−Tcp) is less than or equal to (0.907 times Tmp) minus 100.14, (measured in ° C. on the homopolymer having 0 wt % nucleating agent).

30. A continuous process to produce polypropylene comprising contacting propylene in a reactor at 93 to 150° C. and 8 to 30 MPa, in the presence of an activator and a metallocene selected from dimethylsilyl-bis(2-methyl,4-phenylindenyl) zirconium dimethyl (or dichloride), dimethylsilyl-bis(2-methyl,4-phenylindenyl)hafnium dimethyl (or dichloride), or a mixture thereof; and wherein 15 to less than 30 wt % propylene monomer, and 85 wt % to more than 70 wt % solvent, based on total weight of propylene monomer and solvent, is fed into the polymerization reactor, and the polymerization occurs at a temperature above the solid-fluid phase transition temperature of the polymerization system and above a pressure greater than 1 MPa below the cloud point pressure of the polymerization system, provided however that the polymerization occurs: (1) at a temperature below the critical temperature of the polymerization system, or (2) at a pressure below the critical pressure of the polymerization system, wherein the catalyst productivity is about 100,000 g polymer per g of metallocene or more, and recovering an isotactic propylene homopolymer having:
1) more than 15 and less than 100 regio defects (sum of 2,1-erythro and 2,1-threo insertions and 3,1-isomerizations) per 10,000 propylene units;
2) an Mw (weight average molecular weight) of 35,000 g/mol or more;
3) a peak melting temperature of greater than 149° C.;
4) an mmmm pentad fraction of 0.85 or more;
5) a heat of fusion of 80 J/g or more; and
6) a peak melting temperature minus peak crystallization temperature of less than or equal to (0.907 times Tmp) minus 99.64, as measured in ° C. on the homopolymer having 0 wt % nucleating agent.

31. A continuous process to produce polypropylene comprising contacting propylene in a reactor at 80 to 150° C. and 6.9 to 34.5 MPa, in the presence of an activator and a metallocene represented by the formula:

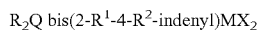

wherein each R is, independently, hydrogen or a $C_1$ to $C_{20}$ hydrocarbyl group, Q is Si, C, CH—CH, or CH—$CH_2$, $R^1$ is a $C_1$ to $C_{12}$ linear, branched or cyclic alkyl group, $R^2$ is phenyl or naphthyl or a substituted naphthyl group, M is Hf or Zr and X is a halide or a $C_1$ to $C_{20}$ hydrocarbyl group; and wherein 15 to less than 30 wt % propylene monomer, and 85 wt % to more than 70 wt % solvent, based on total weight of propylene monomer and solvent, is fed into the polymerization reactor, and the polymerization occurs at a temperature above the solid-fluid phase transition temperature of the polymerization system and above a pressure greater than 1 MPa below the cloud point pressure of the polymerization system, provided however that the polymerization occurs: (1) at a temperature below the critical temperature of the polymerization system or (2) at a pressure below the critical pressure of the polymerization system; wherein the catalyst productivity is about 100,000 g polymer per g of metallocene or more, and recovering an isotactic propylene homopolymer having:
1) more than 15 and less than 100 regio defects (sum of 2,1-erythro and 2,1-threo insertions and 3,1-isomerizations) per 10,000 propylene units;
2) an Mw (weight average molecular weight) of 35,000 g/mol or more;
3) a peak melting temperature of greater than 149° C.;
4) an mmmm pentad fraction of 0.85 or more;
5) a heat of fusion of 80 J/g or more; and
6) a peak melting temperature minus peak crystallization temperature of less than or equal to (0.907 times Tmp) minus 99.64, as measured in ° C. on the homopolymer having 0 wt % nucleating agent.

32. A continuous process to produce polypropylene comprising contacting propylene in a reactor at 80 to 150° C. and 6.9 to 34.5 MPa, in the presence of an activator and a metallocene represented by the formula:

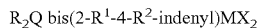

wherein each R is, independently, hydrogen or a $C_1$ to $C_{20}$ hydrocarbyl group, Q is Si, C, CH—CH, or CH—$CH_2$, $R^1$ is a $C_1$ to $C_{12}$ linear, branched or cyclic alkyl group, $R^2$ is phenyl or naphthyl or a substituted naphthyl group, M is Hf or Zr and X is a halide or a $C_1$ to $C_{20}$ hydrocarbyl group; and wherein 20 to less than 30 wt % propylene monomer, and 80 wt % to more than 70 wt % solvent, based on total weight of propylene monomer and solvent, is fed into the polymerization reactor, and the polymerization occurs at a temperature above the solid-fluid phase transition temperature of the polymerization system and above a pressure greater than 1 MPa below the cloud point pressure of the polymerization system, provided however that the polymerization occurs: (1) at a temperature below the critical temperature of the polymerization system or (2) at a pressure below the critical pressure of the polymerization system; wherein the catalyst productivity is about 100,000 g polymer per g of metallocene or more, and recovering an isotactic propylene homopolymer having:
1) more than 15 and less than 100 regio defects (sum of 2,1-erythro and 2,1-threo insertions and 3,1-isomerizations) per 10,000 propylene units;
2) an Mw (weight average molecular weight) of 35,000 g/mol or more;
3) a peak melting temperature of greater than 149° C.;
4) an mmmm pentad fraction of 0.85 or more;
5) a heat of fusion of 80 J/g or more; and
6) a peak melting temperature minus peak crystallization temperature of less than or equal to (0.907 times Tmp) minus 99.64, as measured in ° C. on the homopolymer having 0 wt % nucleating agent.

33. The process according to claim 31, wherein the residence time is about 3 minutes to about 30 minutes.

34. The process according to claim 31, wherein the activator is selected from the group consisting of aluminoxane, trimethylammoniumtetrakis(pentafluorophenyl)borate, N,N-dimethylaniliniumtetrakis (pentafluorophenyl)borate, triphenylcarbeniumtetrakis(perfluorophenyl)borate, N,N-dimethylaniliniumtetrakis (perfluoronaphthyl)borate, N,N-dimethylaniliniumtetrakis (perfluorophenyl)borate, and mixtures thereof.

35. The process according to claim 31, wherein the peak melting temperature minus peak crystallization temperature (Tmp−Tcp) is less than or equal to (0.907 times Tmp) minus 100.14, (measured in ° C. on the homopolymer having 0 wt % nucleating agent).

36. The process according to claim 31, wherein the peak melting temperature minus peak crystallization temperature (Tmp−Tcp) is less than or equal to (0.907 times Tmp) minus 100.64, (measured in ° C. on the homopolymer having 0 wt % nucleating agent).

37. The process according to claim 31, wherein the polypropylene has an mmmm pentad fraction of 0.98 or greater.

38. The process according to claim 31, wherein the polypropylene has more than 17 and less than 95 defects per 10,000 propylene units.

39. The process according to claim 31, wherein Mw is 200,000 g/mol or greater, the mmmm pentad fraction is 0.98 or greater, the peak melting temperature (Tmp) is from greater than 149° C. to 170° C., and the heat of fusion is 95 J/g or greater.

40. The process according to claim 1 wherein 15 wt % to 27 wt % propylene monomer is fed into the polymerization reactor.

41. The process according to claim 21 wherein 15 wt % to 27 wt % propylene monomer is fed into the polymerization reactor.

42. The process according to claim 1 wherein 15 wt % to 25 wt % propylene monomer is fed into the polymerization reactor.

43. The process according to claim 21 wherein 15 wt % to 25 wt % propylene monomer is fed into the polymerization reactor.

44. The process according to claim 1 wherein 15 wt % to 22 wt % propylene monomer is fed into the polymerization reactor.

45. The process according to claim 21 wherein 15 wt % to 22 wt % propylene monomer is fed into the polymerization reactor.

46. The process according to claim 1 wherein 15 wt % to 20 wt % propylene monomer is fed into the polymerization reactor.

47. The process according to claim 21 wherein 15 wt % to 20 wt % propylene monomer is fed into the polymerization reactor.

* * * * *